(12) United States Patent
Nakata

(10) Patent No.: US 11,917,298 B2
(45) Date of Patent: Feb. 27, 2024

(54) ELECTRONIC DEVICE

(71) Applicant: SONY SEMICONDUCTOR SOLUTIONS CORPORATION, Kanagawa (JP)

(72) Inventor: Masashi Nakata, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/759,443

(22) PCT Filed: Jan. 22, 2021

(86) PCT No.: PCT/JP2021/002262
§ 371 (c)(1),
(2) Date: Jul. 26, 2022

(87) PCT Pub. No.: WO2021/157389
PCT Pub. Date: Aug. 12, 2021

(65) Prior Publication Data
US 2023/0103098 A1 Mar. 30, 2023

(30) Foreign Application Priority Data

Feb. 3, 2020 (JP) ................................ 2020-016362

(51) Int. Cl.
*H04N 23/51* (2023.01)
*H04N 23/698* (2023.01)
(Continued)

(52) U.S. Cl.
CPC ......... *H04N 23/698* (2023.01); *G06F 1/1641* (2013.01); *G06F 1/1652* (2013.01);
(Continued)

(58) Field of Classification Search
None
See application file for complete search history.

(56) References Cited

U.S. PATENT DOCUMENTS

2005/0041156 A1* 2/2005 Kondo .................. H04N 5/145
348/700
2011/0310127 A1* 12/2011 Arai ......................... G06T 3/40
345/660

(Continued)

FOREIGN PATENT DOCUMENTS

CN 106027862 A 10/2016
CN 107277196 A 10/2017

(Continued)

OTHER PUBLICATIONS

International Search Report and Written Opinion of PCT Application No. PCT/JP2021/002262, dated Mar. 23, 2021, 11 pages of ISRWO.

(Continued)

*Primary Examiner* — Eileen M Adams
(74) *Attorney, Agent, or Firm* — CHIP LAW GROUP

(57) ABSTRACT

Provided is an electronic device that implements image-capturing with a wide angle of view with a compact housing. An electronic device according to the present disclosure includes: a display unit (2) configured to be deformable; and at least one first imaging unit (3) arranged on an opposite side of a display surface of the display unit (2) and configured to image incident light transmitted through the display unit. The display unit (2) may be foldable. Furthermore, at least a part of the display unit (2) may be bendable. Moreover, in the first imaging unit (3), an optical system used for image-capturing may be switchable in accordance with a shape of the display unit (2).

20 Claims, 23 Drawing Sheets

(51) Int. Cl.
  *H04N 23/90* (2023.01)
  *H04N 23/63* (2023.01)
  *G06F 1/16* (2006.01)
  *H04N 5/262* (2006.01)
  *H04N 5/77* (2006.01)

(52) U.S. Cl.
  CPC ........... *H04N 5/2628* (2013.01); *H04N 5/772* (2013.01); *H04N 23/51* (2023.01); *H04N 23/632* (2023.01); *H04N 23/90* (2023.01)

(56) References Cited

U.S. PATENT DOCUMENTS

| | | | |
|---|---|---|---|
| 2014/0285618 A1 | 9/2014 | Cho et al. | |
| 2016/0381289 A1* | 12/2016 | Kim | H04N 23/69 348/38 |
| 2018/0324356 A1* | 11/2018 | Sarraju | H04N 23/57 |
| 2019/0082101 A1 | 3/2019 | Baldwin et al. | |
| 2019/0259351 A1* | 8/2019 | Yoon | G09G 3/035 |
| 2020/0356590 A1* | 11/2020 | Clarke | G06F 9/451 |

FOREIGN PATENT DOCUMENTS

| | | |
|---|---|---|
| CN | 107770442 A | 3/2018 |
| CN | 108008889 A | 5/2018 |
| JP | 2019-008202 A | 1/2019 |
| JP | 2019-506651 A | 3/2019 |

OTHER PUBLICATIONS

Ilse Jurrien, "Xiaomi foldable phone with triple rear camera", LetsGoDigital, Mi Xiaomi, Aug. 18, 2019, 13 pages.

* cited by examiner

ELECTRONIC DEVICE

CROSS REFERENCE TO RELATED APPLICATIONS

This application is a U.S. National Phase of International Patent Application No. PCT/JP2021/002262 filed on Jan. 22, 2021, which claims priority benefit of Japanese Patent Application No. JP 2020-016362 filed in the Japan Patent Office on Feb. 3, 2020. Each of the above-referenced applications is hereby incorporated herein by reference in its entirety.

TECHNICAL FIELD

The present disclosure relates to an electronic device.

BACKGROUND ART

In general, a camera is mounted in a housing of an electronic device such as a smartphone, a tablet, a game machine, or a personal computer (PC). Today, the use of cameras mounted on electronic devices is not limited to video call or selfie, but is also expanding to image-capturing of scenery, portraits, and high-speed subjects, and the like. For this reason, in recent years, there is an increasing demand for improvement in performance of cameras mounted on electronic devices.

CITATION LIST

Patent Document

Patent Document 1: Japanese Patent Application Laid-Open No. 2019-506651
Patent Document 2: Japanese Patent Application Laid-Open No. 2019-8202

SUMMARY OF THE INVENTION

Problems to be Solved by the Invention

One of the performance requirements of cameras is a size of an angle of view at which an image can be captured. When a camera having a wide angle of view is used, it is possible to capture a powerful image or an image including the entire subject having a large size. Therefore, there is a great potential need for increasing the angle of view of cameras mounted on electronic devices.

However, when a camera with a fisheye lens is mounted to increase the angle of view, there has been a problem that a protrusion is formed in the electronic device or a housing of the electronic device becomes large. Furthermore, when a camera having a large angle of view is mounted in a housing of the electronic device, there is a possibility that an adjacent component is included in a captured image.

Therefore, the present disclosure provides an electronic device that implements image-capturing with a wide angle of view with a compact housing.

Solutions to Problems

An electronic device according to one aspect of the present disclosure may include: a display unit configured to be deformable; and at least one first imaging unit arranged on an opposite side of a display surface of the display unit and configured to image incident light transmitted through the display unit.

The display unit may be foldable.

The display unit may include a first area, a second area, and a third area, and a portion between the first area and the second area of the display unit and a portion between the second area and the third area of the display unit may be able to be mountain folded.

The first imaging unit may be arranged on an opposite side of the display surface in the second area.

In the display unit, the first imaging unit may be individually arranged on an opposite side of the display surface in the first area and on an opposite side of the display surface in the third area.

At least a part of the display unit may be bendable.

The first imaging unit may be arranged at a position corresponding to an inner peripheral side of a convex curved surface formed when the display unit is bent.

When the display unit is bent, at least a part of a member on a light incident direction side from the first imaging unit may be moved out of an angle of view of the first imaging unit.

A second imaging unit arranged on a surface on a side opposite to the display unit may be further included.

In the first imaging unit, an optical system used for image-capturing may be switchable in accordance with a shape of the display unit.

A processing circuit configured to output, to the display unit, a first image based on a captured image of the first imaging unit, may be further included.

The processing circuit may be configured to determine a position and a range of the display unit in which each portion of the first image is displayed, in accordance with an angle of view in the captured image.

The display unit may include a touch panel, and the processing circuit may be configured to detect at least any subject included in the captured image.

The processing circuit may be configured to detect that an area in which a subject is displayed on the display unit is touched, and output a second image obtained by cropping a partial angle of view of the first imaging unit including the area, to at least any part of the display unit.

The processing circuit may be configured to detect that an area in which a subject is displayed on the display unit is touched, and start recording of a first video image obtained by cropping a partial angle of view of the first imaging unit including the area.

The processing circuit may be configured to record a second video image having a larger angle of view than the first video image, in parallel with recording of the first video image.

An electronic device according to one aspect of the present disclosure may include: a display unit configured to be deformable; and an imaging unit configured to image incident light transmitted through the display unit, in which the imaging unit may be configured to perform imaging at a first angle of view in a case where the display unit is in a first shape, and perform imaging at a second angle of view wider than the first angle of view in a case where the display unit is in a second shape.

The first shape may be an unfolded state, and the second shape may be a folded state.

An electronic device according to one aspect of the present disclosure may include: a display unit configured to be deformable; and a third imaging unit and a fourth imaging unit each configured to image incident light transmitted through the display unit, in which the third imaging unit may be configured to perform imaging at a third angle of view, the fourth imaging unit may be configured to perform imaging at a fourth angle of view, the third angle of view and the fourth angle of view may partially overlap each other in a case where the display unit is in a first shape, and the third angle of view and the fourth angle of view may not overlap each other in a case where the display unit is in a second shape.

There may be further included a processing circuit configured to synthesize an image obtained by the third imaging unit and an image obtained by the fourth imaging unit in a case where the display unit is in the second shape.

MODE FOR CARRYING OUT THE INVENTION

Figure 1:
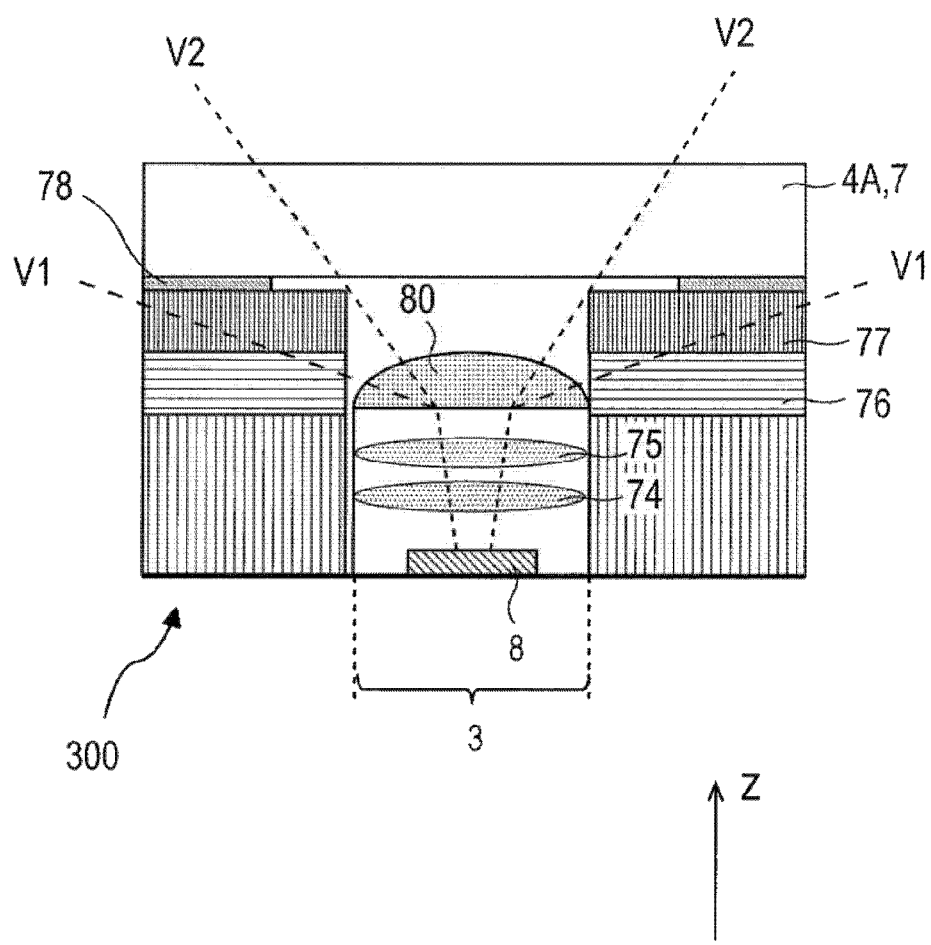
FIG. 1 is a view illustrating an example of narrowing an image-capturing angle of view by an adjacent component.

Hereinafter, a preferred embodiment of the present disclosure will be described in detail with reference to the accompanying drawings. Note that, in the present specification and the drawings, components having substantially the same functional configuration are denoted by the same reference numerals, and redundant explanations are omitted.

In an electronic device such as a smartphone, a tablet, a game machine, a personal computer (PC), or a display device, a camera (a front camera) may be mounted on a frame (a bezel) of a display unit of the electronic device so that video call or selfie can be performed. However, in order to enlarge a screen size or to display an image with higher resolution, an electronic device with a narrower bezel width and a bezel-less electronic device have been provided. For this purpose, it has been proposed that the camera is mounted at a position behind a display panel when the display panel is viewed from the front, instead of the bezel. In this case, the camera captures an image with light transmitted through the display panel. Such a camera is also referred to as an under-display camera.

A cross-sectional view of FIG. 1 illustrates an example of an electronic device 300 including an imaging unit 8 that performs image-capturing with light having passed through a display panel 4A. In the electronic device 300, the display panel 4A, a support member 78, a transistor layer 77, and a wiring layer 76 are stacked from an upper side to a lower side. Note that, in the following description, a z-axis positive direction in the figure is referred to as upper, and a z-axis negative direction in the figure is referred to as lower. The display panel 4A may be protected by a protective layer 7. The protective layer 7 is formed by, for example, a glass material. However, other materials may be used as the protective layer 7 as long as visible light can be transmitted.

As illustrated in FIG. 1, on a lower side of the display panel 4A, there is a portion where the transistor layer 77 and the wiring layer 76 are not formed. In the portion where the transistor layer 77 and the wiring layer 76 are not formed on the lower side of the display panel 4A, a camera module 3 is mounted. In the camera module 3, a fisheye lens 80, a lens 75, a lens 74, and the imaging unit 8 are arranged from the upper side to the lower side. The fisheye lens 80, the lens 75, and the lens 74 form one optical system that condenses light transmitted through the display panel 4A, on the imaging unit 8. The imaging unit 8 is a component that performs imaging by photoelectric conversion. The imaging unit 8 can include, for example, a complementary metal oxide semiconductor (CMOS) sensor, a charge coupled device (CCD) sensor, an organic photoelectric conversion film, or a combination thereof.

Since the fisheye lens 80 is provided, the camera module 3 itself can perform image-capturing at an angle of view V1 in FIG. 1. However, the angle of view V1 includes a part of the transistor layer 77 and the wiring layer 76 adjacent to the camera module 3. Therefore, an angle of view at which the camera module 3 mounted on the electronic device 300 can actually perform image-capturing is an angle of view V2 narrower than the angle of view V1. An angle of view at which the imaging unit (the camera module) can actually perform image-capturing, such as the angle of view V2 in FIG. 1, is referred to as an effective angle of view.

Figure 2:
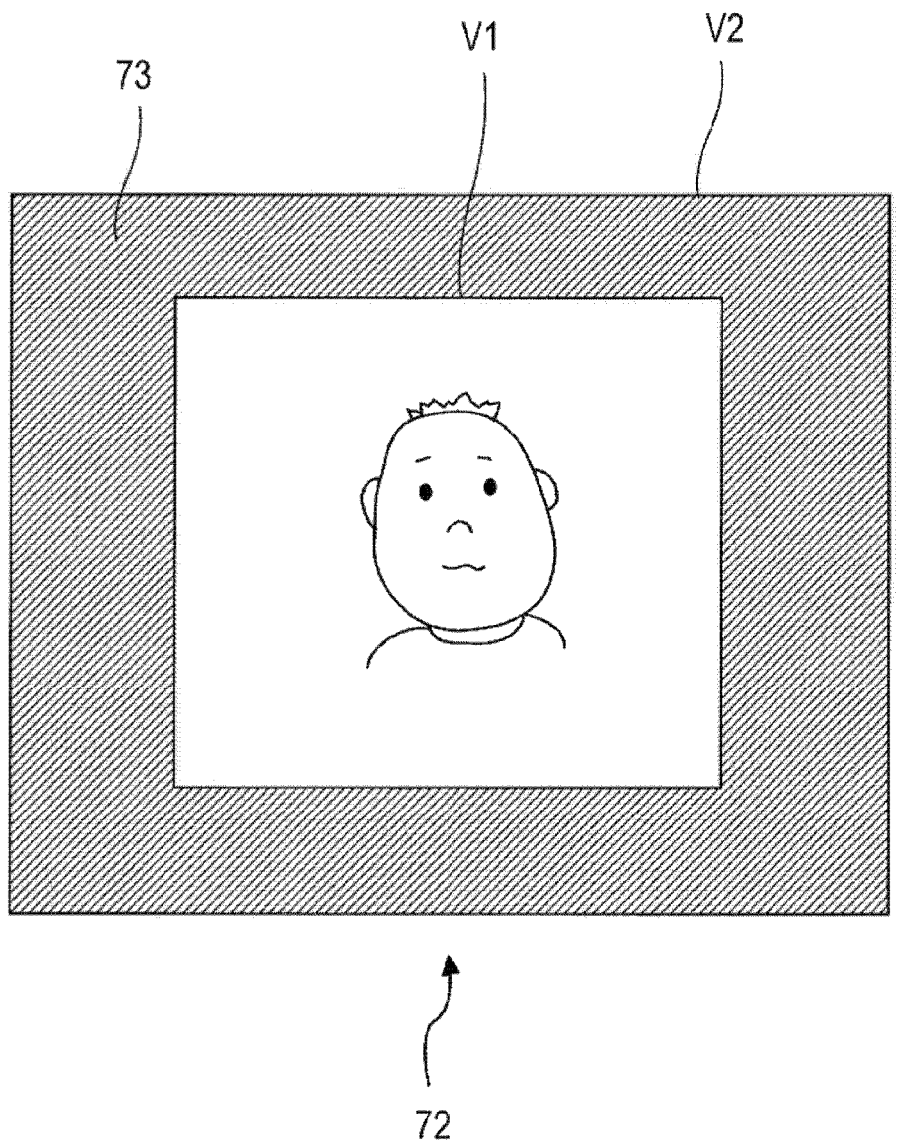
FIG. 2 is a view illustrating an example of a range of an effective angle of view in a captured image.

An image 72 in FIG. 2 illustrates an example of a relationship between the angle of view V1 and the angle of view V2 in an image captured by the imaging unit 8. There is a possibility that the transistor layer 77 and the wiring layer 76 adjacent to the camera module 3 are included in an area 73 between the angle of view V1 and the angle of view V2. Therefore, a portion inside the area 73 of the image 72 may be discarded by a circuit connected in a subsequent stage of the imaging unit 8. Processing of discarding a portion other than the effective angle of view in the image captured by the imaging unit 8 corresponds to cropping (also referred to as trimming) processing of the effective angle of view. In this case, a portion inside the area 73 in the image 72 is provided to a user of the electronic device 300 as a captured image.

When the image is cropped as in the example of FIG. 2, the user can obtain only a captured image with a limited angle of view regardless of performance of the camera module 3 (the optical system and the imaging unit 8). Furthermore, it is inevitable that the number of pixels included in the captured image decreases. Therefore, in the present disclosure, an electronic device that uses a flexible display as a display panel and implements image-capturing with a wide angle of view with a compact housing will be described. That is, the electronic device according to the present disclosure has an image display function and an image-capturing function.

Figure 3:
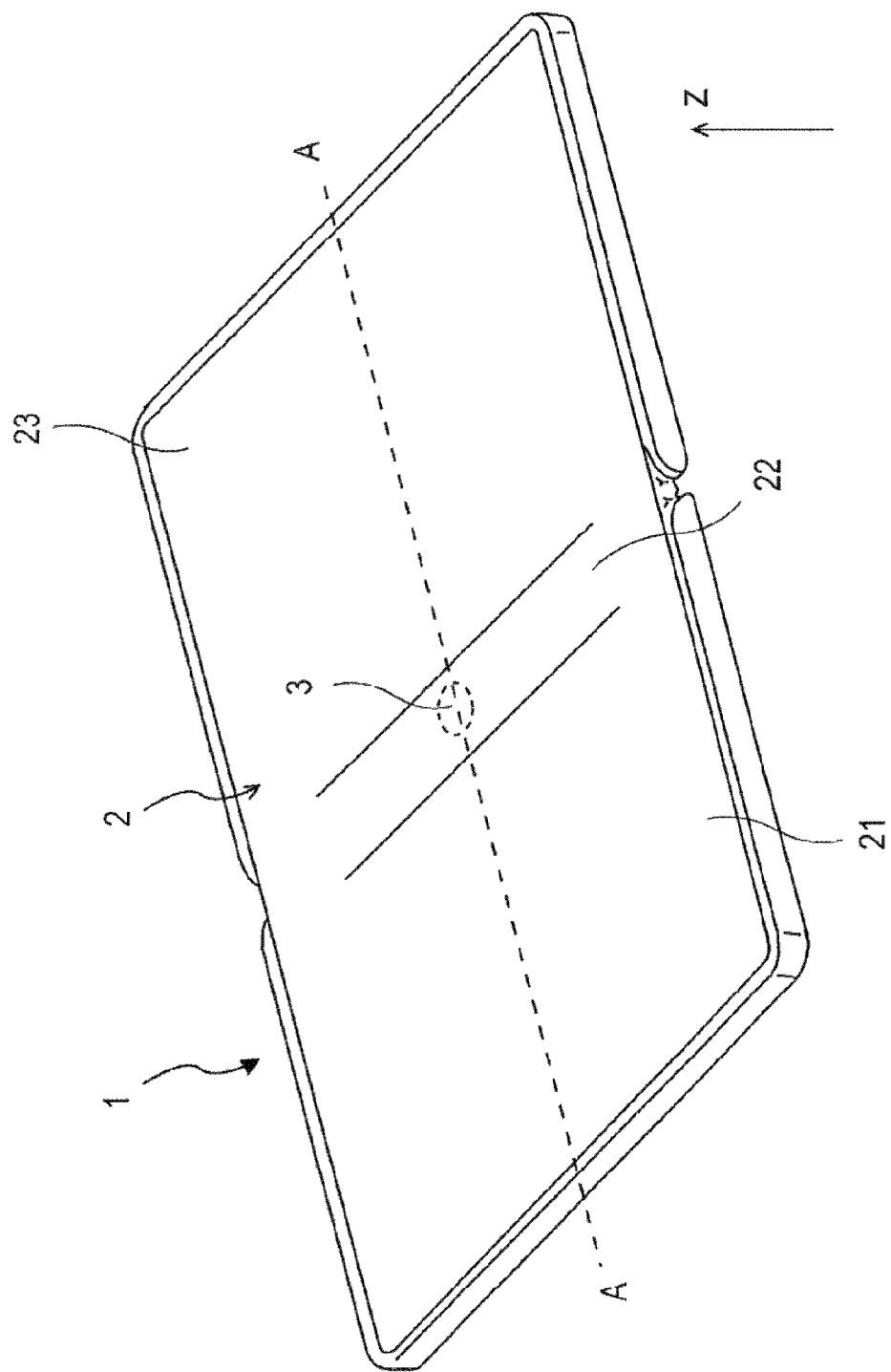
FIG. 3 is a perspective view illustrating an example of an unfolded state of an electronic device according to the present disclosure.
Figure 4:
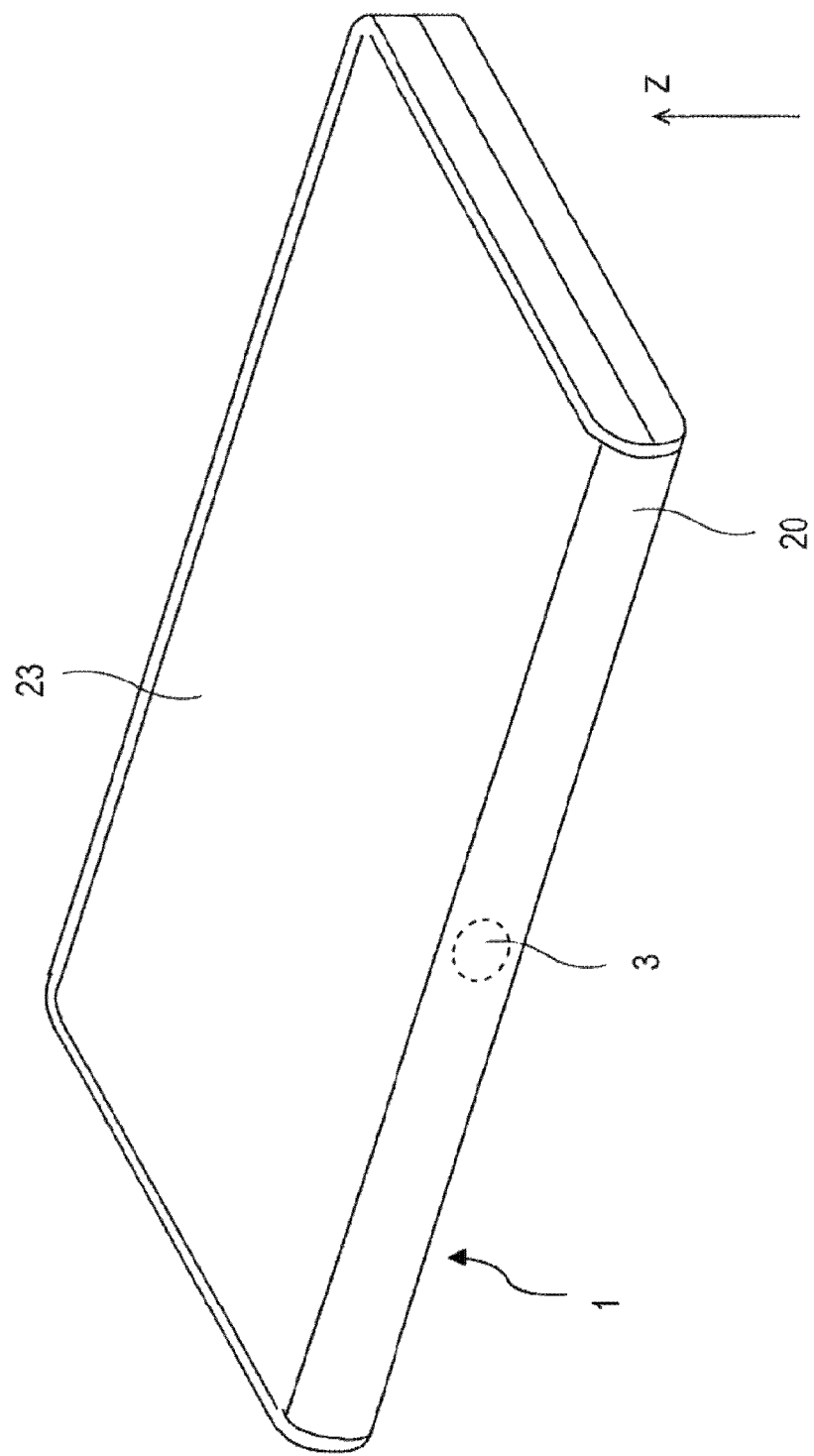
FIG. 4 is a perspective view illustrating an example of a folded state of the electronic device according to the present disclosure.

FIGS. 3 and 4 are perspective views illustrating an example of an electronic device according to the present disclosure. FIG. 3 illustrates an example of a shape of an electronic device 1 in an unfolded state. On an upper surface (a first surface) of the electronic device 1, a display unit 2 is mounted. The display unit 2 includes a flexible display. As the flexible display, for example, a combination of a polyimide and an organic light emitting diode (OLED) can be used. However, materials and methods used in the flexible display are not limited. For example, instead of the polyimide, other bendable materials such as a flexible glass sheet may be used. Furthermore, instead of the OLED, other method of display such as a liquid crystal or a micro LED array may be used.

The display unit 2 is sectioned into a first area 21, a second area 22, and a third area 23. The first area 21, the second area 22, and the third area 23 in FIG. 3 all have a substantially rectangular shape in plan view. However, shapes of the display unit and the areas of the display unit of the electronic device according to the present disclosure are not limited. The electronic device 1 is foldable such that a mountain fold is formed between the first area 21 of the display unit 2 and the second area 22 of the display unit 2 when viewed from above in FIG. 3. Similarly, in the folded state, the electronic device 1 is foldable such that a mountain fold is formed between the second area 22 of the display unit 2 and the third area 23 of the display unit 2 when viewed from above in FIG. 3. That is, the electronic device 1 is configured to be foldable like a book cover or a long wallet.

FIG. 4 illustrates an example of a shape of the electronic device 1 in a folded state. Referring to FIG. 4, the electronic device 1 is folded such that a display surface of the display unit 2 faces outside a housing. That is, in FIG. 4, the display unit 2 is folded outward. To give a metaphorical explanation using a bound book as an example, the display surface of the display unit 2 is arranged in areas corresponding to a front cover, a spine, and a back cover when the electronic device 1 is folded. That is, in FIG. 4, the third area 23 of the display unit 2 is arranged on a first surface (corresponding to the front cover) on an upper side of the electronic device 1, the first area 21 of the display unit 2 is arranged on a second surface (corresponding to the back cover) on an opposite side of the first surface of the electronic device 1, and the second area 22 is arranged on a third surface (corresponding to the spine) of the electronic device 1 perpendicular to the first surface and the second surface.

That is, in the electronic device according to the present disclosure, when the display unit is folded, the first area of the display unit and the second area of the display unit may face in opposite directions.

Furthermore, the camera module 3 is mounted at a position behind the second area 22 of the display unit 2 when viewed from the front. That is, the camera module 3 (a first imaging unit) is arranged on an opposite side of the display surface in the second area 22. Therefore, the camera module 3 of the electronic device 1 performs image-capturing with light transmitted through the second area 22 of the display unit 2. In the case of the example of FIG. 4, the camera module 3 can perform image-capturing at an angle of view including a direction of the third surface.

The electronic device 1 may include a lock mechanism (not illustrated) that fixes a shape. By using the lock mechanism, the electronic device 1 can be fixed in the unfolded state or the folded state. In this case, a detailed configuration of the lock mechanism is not particularly limited. Using the lock mechanism makes it possible to prevent the shape of the electronic device 1 from changing at a timing not intended by the user.

In this way, the display unit of the electronic device according to the present disclosure may include the first area, the second area, and the third area. A portion between the first area and the second area of the display unit and a portion between the second area and the third area of the display unit may be able to be mountain folded.

Here, the electronic device having a substantially flat plate shape in both the unfolded state and the folded state has been described as an example. However, the shape of the electronic device illustrated here is merely an example. Accordingly, the shape of the electronic device according to the present disclosure in at least any one of the unfolded state or the folded state may be different from this.

Figure 5:
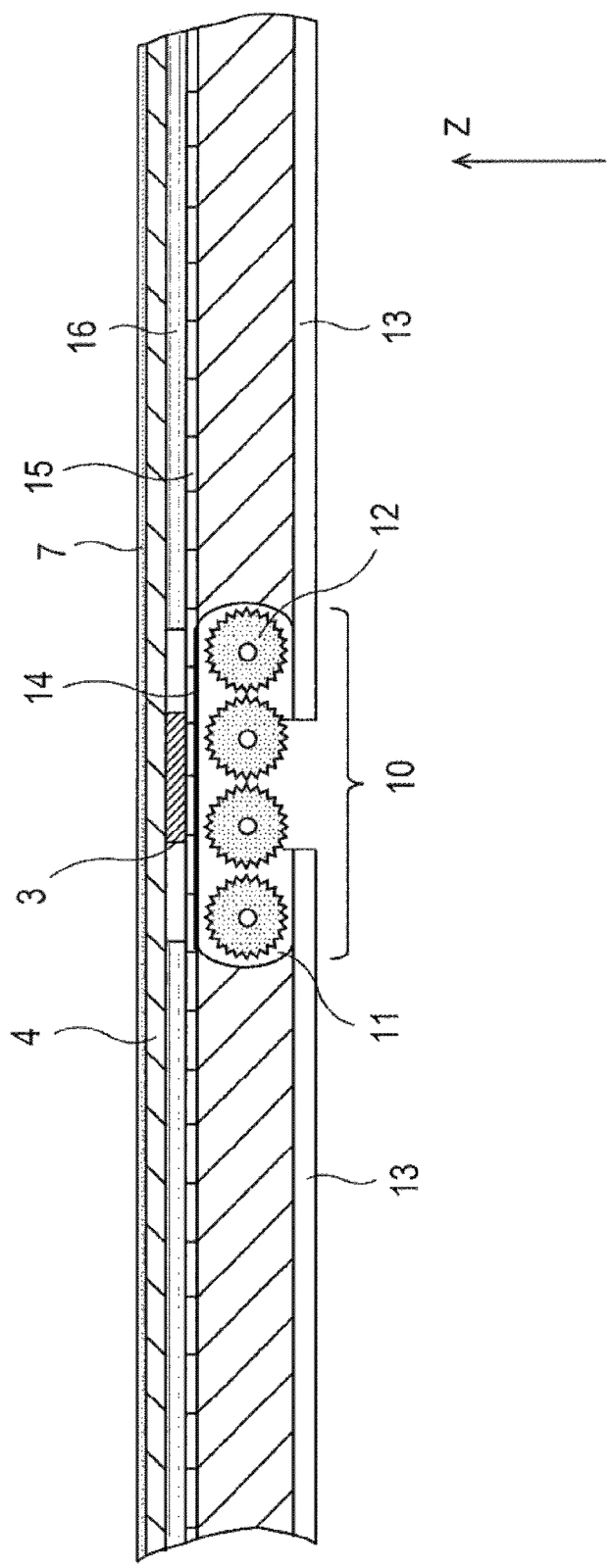
FIG. 5 is a cross-sectional view illustrating an example of the unfolded state of the electronic device according to the present disclosure.
Figure 6:
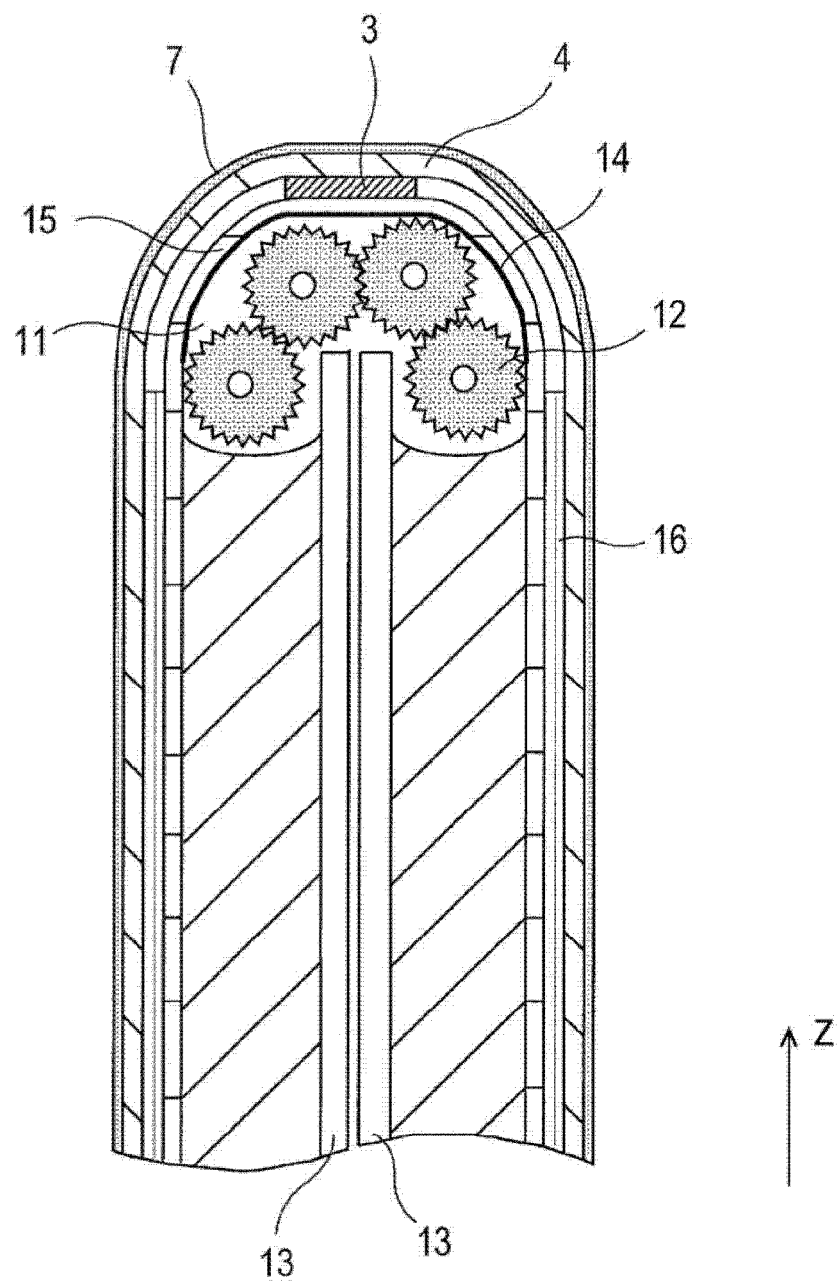
FIG. 6 is a cross-sectional view illustrating an example of the folded state of the electronic device according to the present disclosure.

FIG. 5 is a cross-sectional view of the electronic device 1 of FIG. 3 taken along line AA. Whereas, FIG. 6 illustrates the cross-sectional view of FIG. 5 in the folded state. FIGS. 5 and 6 both illustrate an enlarged portion of the electronic device 1 where the camera module 3 is mounted. The camera module 3 is mounted on a support member 15. The support member 15 may include, for example, at least any one of the transistor layer 77 or the wiring layer 76 in FIG. 1. On an upper side of the camera module 3, a display panel 4 is arranged. The display panel 4 corresponds to the above-described flexible display. Whereas, in a portion where the camera module 3 is not arranged on a lower side of the display panel 4, a support member 16 is arranged. The display panel 4 is protected by the protective layer 7. As the protective layer 7, for example, a material that transmits light and is bendable, such as a polyimide or a flexible glass sheet, can be used. The protective layer 7 and the display panel 4 correspond to the above-described display unit 2.

As the support member 15, for example, a flexible substrate including a plastic film, a polyimide, or PET can be used. As the support member 16, a material containing a plastic film, a polyimide, or PET can be used. At least portions of the support members 15 and 16 above a folding mechanism 10 may be formed by a material having elasticity and flexibility. However, types of materials used as the support members 15 and 16 are not limited.

On a side of the support member 15 opposite to a side on which the camera module 3 is arranged, the folding mechanism 10 is provided. The folding mechanism 10 implements a mountain fold deformation between the first area 21 of the display unit 2 and the second area 22 of the display unit 2 described above, a mountain fold deformation between the second area 22 of the display unit 2 and the third area 23 of the display unit 2 described above, and restoration from these deformations to an original shape. The folding mechanism 10 in FIGS. 5 and 6 is implemented by combining a plurality of gears 12 in a space 11 provided in the housing of the electronic device 1. The plurality of gears 12 is formed by, for example, resin or metal. However, the material of the plurality of gears 12 is not limited.

Above the gear 12, a sensor 14 is arranged. The sensor 14 is a sensor capable of detecting a deformation in at least any part of the electronic device 1. For example, in the case of the examples of FIGS. 5 and 6, the sensor 14 detects the presence or absence of folding by the folding mechanism 10. As the sensor 14, for example, a distortion gauge can be used. However, other types of sensors may be used as the sensor 14. The sensor 14 is only required to be mounted at a position where a deformation of the electronic device 1 (the display unit 2) can be detected. Therefore, the sensor 14 may be arranged at a position different from the example of FIGS. 5 and 6.

Note that a protection member may be arranged above the gear 12 in order to prevent the sensor 14 and the support member 15 from being damaged by the gear 12. In this case, the protective member can be formed by using a material having higher hardness than that of the gear 12. However, the material of the protective member is not limited. Furthermore, on an opposite side of the protective layer 7 and the display panel 4 of the electronic device 1, a plate-shaped member 13 is arranged. The plate-shaped member 13 supports other components of the electronic device 1 and maintains a substantially plate-shaped structure of the housing.

Note that the folding mechanism 10 illustrated in FIGS. 5 and 6 is merely an example. Accordingly, the electronic device according to the present disclosure may include a folding mechanism having a structure different from this. For example, the folding mechanism may be implemented by using a turnable component such as a hinge.

In the display panel 4, at least a portion on an upper side of the camera module 3 and a portion in the vicinity thereof have transmissivity to an electromagnetic wave in a wavelength band used for image-capturing by the camera module 3. For example, in a case where the imaging unit 8 in the camera module 3 performs image-capturing with visible light, the above-described portion of the display panel 4 has transmissivity to a visible light band. Furthermore, in a case where the imaging unit 8 in the camera module 3 performs image-capturing with infrared light, the above-described portion of the display panel 4 has transmissivity to an infrared light band.

Referring to FIG. 6 corresponding to the folded state of the electronic device 1, members (the display panel 4 and the protective layer 7) having transmissivity to light are arranged all areas above and in left and right of the camera module 3. Therefore, unlike the electronic device 300 in FIG. 1, the angle of view at which an image can be captured by the camera module 3 (the imaging unit 8) is not narrowed by including an adjacent member. Therefore, when the electronic device 1 in the folded state is used, it is possible to perform image-capturing with a wider angle of view. The user may perform image-capturing while rotating the electronic device 1 about a z axis in the state of FIG. 6. Such an image-capturing mode of the electronic device 1 is referred to as a wide-angle image-capturing mode. By using the wide-angle image-capturing mode, the user can capture a wide-angle image of 180 degrees to 360 degrees with respect to the z axis. Note that a rotation operation of the electronic device 1 when the wide-angle image-capturing mode is used may be manually performed by the user or may be performed by a rotary machine (not illustrated) such as a motor.

In the examples of FIGS. 5 and 6, the shape of the camera module 3 hardly changes regardless of the deformation of the display panel 4 and the protective layer 7 (the display unit 2). Therefore, in the electronic device according to the present disclosure, it is possible to mount a camera module (an imaging unit) that maintains an original shape regardless of a deformation of the display unit. As a result, a general camera module (imaging unit) having no remarkable elasticity and flexibility can be used.

Note that, in order to suppress stress applied to the camera module 3, a bottom part of the camera module 3 may be supported by a plate-shaped structure. Furthermore, a structure that supports a portion other than an upper surface of the camera module 3 may be provided. For example, these structures can be formed by metal, but the material of the structure is not limited. By providing a structure that suppresses stress applied to the camera module 3, it is possible to prevent damage to the camera module 3 during a deformation of the electronic device 1.

An electronic device according to the present disclosure may include a display unit configured to be deformable, and an imaging unit configured to image incident light transmitted through the display unit. In this case, the imaging unit may be configured to perform imaging at a first angle of view in a case where the display unit is in a first shape, and perform imaging at a second angle of view wider than the first angle of view in a case where the display unit is in a second shape. For example, the first shape is an unfolded state, and the second shape is a folded state. However, at least any one of the first shape or the second shape may be a state different from this. For example, the first shape may be an unbent state, and the second shape may be a bent state.

Figure 7:
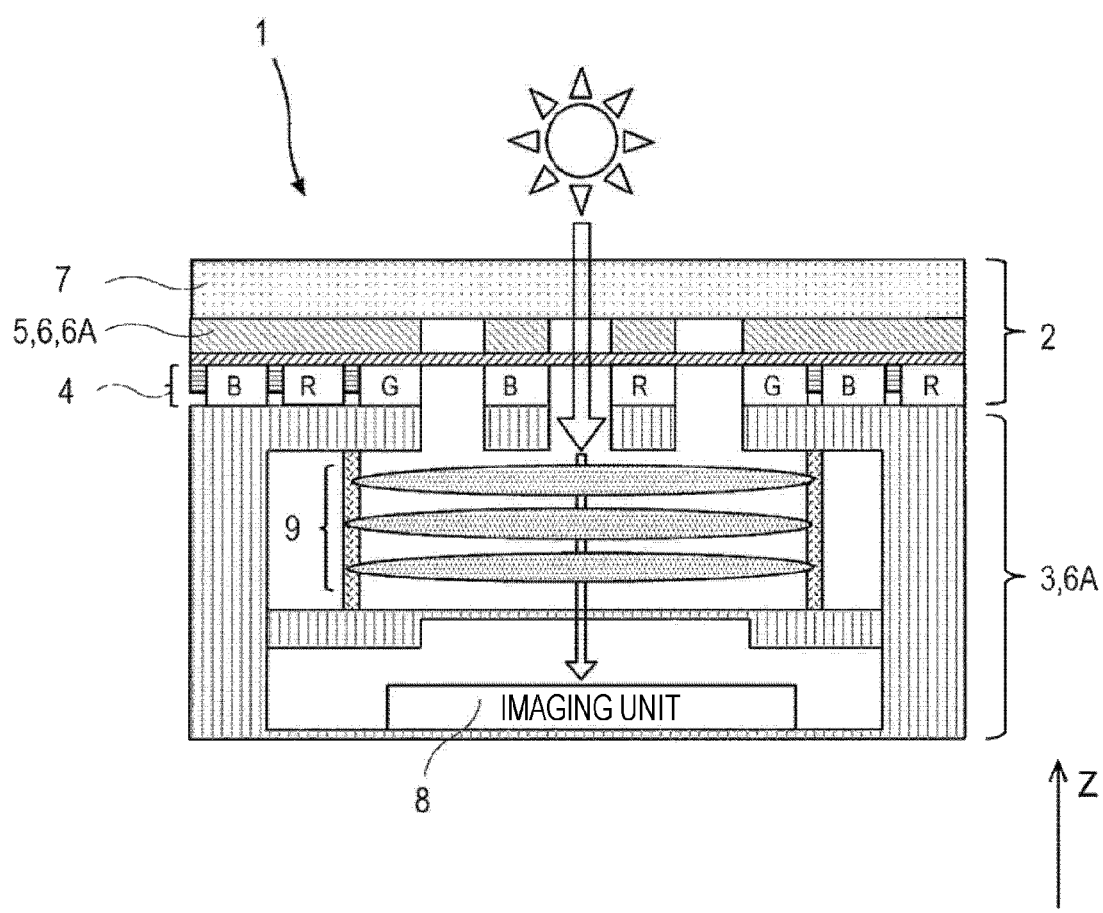
FIG. 7 is a schematic cross-sectional view of the electronic device according to the present disclosure.

FIG. 7 is a cross-sectional view of a portion including the display unit 2 and the camera module 3 of the electronic device 1. Hereinafter, an example of a configuration of the electronic device 1 will be described with reference to FIG. 7.

The electronic device 1 of FIG. 7 includes the display unit 2 and the camera module 3 (the imaging unit). The camera module 3 is mounted on a side opposite to the display surface of the display unit 2. That is, when the display unit 2 in FIG. 7 is viewed from above, the camera module 3 is arranged behind the display unit 2. Therefore, the camera module 3 of the electronic device 1 performs image-capturing with light transmitted through the display unit 2.

As illustrated in FIG. 7, as the display unit 2, a structure can be used in which the display panel 4, a circularly polarizing plate 5, a touch panel 6, and the protective layer 7 are sequentially stacked. The display panel 4 is, for example, a plate-shaped structure (the flexible display) that displays an image by an electrical method and has flexibility and elasticity. The display panel 4 is, for example, an organic light emitting device (OLED), a liquid crystal panel, or a micro LED. However, the method of the display panel 4 is not limited.

Generally, the display panel 4 such as an OLED or a liquid crystal has a plurality of layers. For example, a part of the display panel 4 includes a member that reduces light transmissivity, such as a color filter layer. Therefore, as illustrated in FIG. 1, a through hole may be provided in a member that prevents light transmission in the display panel 4, in accordance with a position of the camera module 3. Light having passed through the through hole can be incident on the camera module 3 without passing through the corresponding member. As a result, it is possible to suppress deterioration in image quality of an image captured by the camera module 3.

The circularly polarizing plate 5 is mounted for the purpose of, for example, reducing glare or improving visibility. The touch panel 6 is a plate-shaped structure in which a touch sensor is incorporated. Examples of the touch sensor include a capacitance touch sensor or a resistive film touch sensor. However, any type of touch sensor may be used. Note that, in the electronic device according to the present disclosure, a display panel in which a function of a touch panel is integrated may be used. The protective layer 7 is provided to protect the display panel 4 from outside.

Note that the display unit 2 may include a fingerprint sensor 6A. As the fingerprint sensor 6A, for example, an optical fingerprint sensor or an ultrasonic fingerprint sensor can be used. However, a method of the fingerprint sensor is not limited. For example, the fingerprint sensor 6A may be mounted on at least any one layer of the display unit 2. Furthermore, the fingerprint sensor 6A may be mounted in the camera module 3.

The camera module 3 includes, for example, the imaging unit 8 and an optical system 9. The optical system 9 is arranged between the display unit 2 and the imaging unit 8. The optical system 9 condenses light transmitted through the display unit 2, on the imaging unit 8. The optical system 9 may include a plurality of lenses. In order to obtain a wide angle of view, the optical system 9 may include a fisheye lens.

Figure 8:
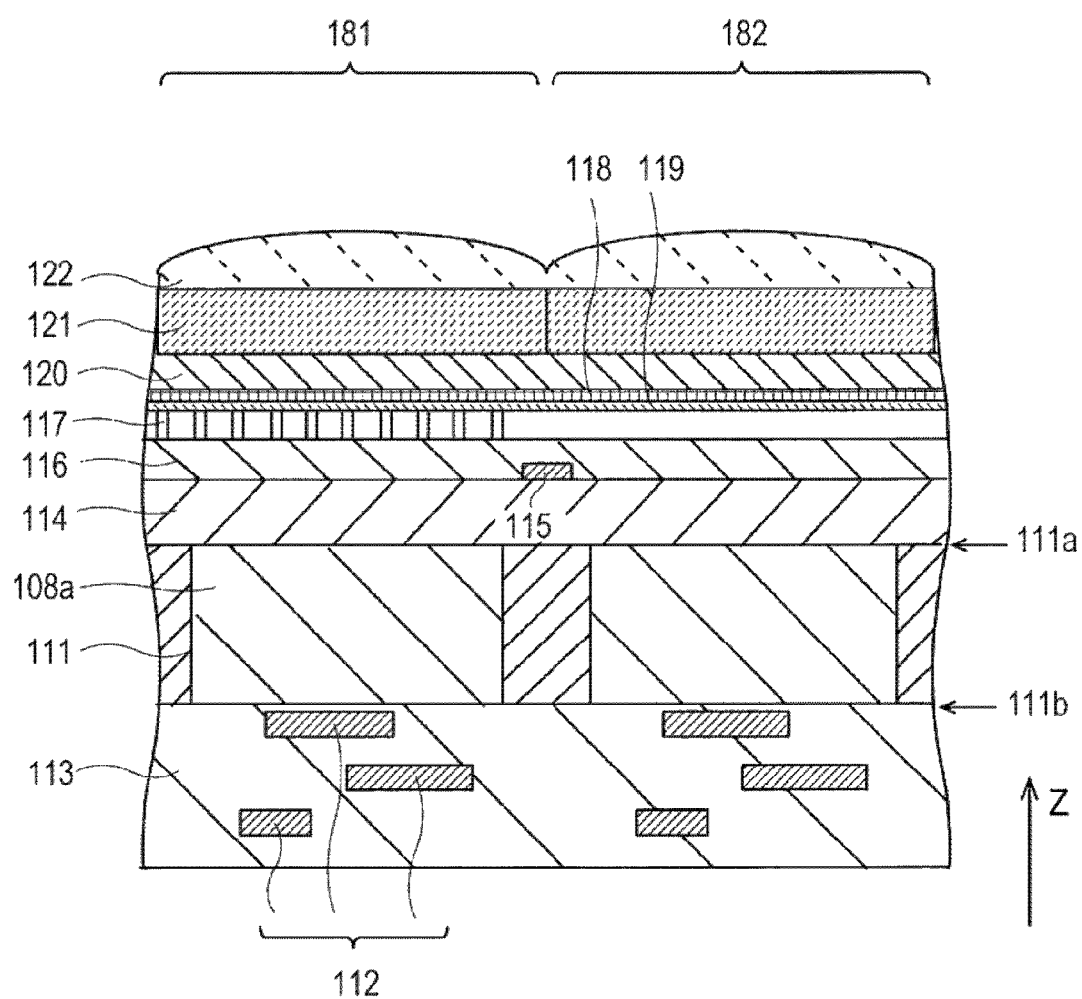
FIG. 8 is a view illustrating an example of a cross-sectional structure of an imaging unit according to the present disclosure.

FIG. 8 illustrates an example of a detailed cross-sectional structure of the imaging unit. Similarly to the above, a z-axis positive direction is referred to as "upper", and a z-axis negative direction is referred to as "lower". In the imaging unit 8 of FIG. 7, a plurality of photoelectric conversion units 108a is formed in a substrate 111. Examples of the photoelectric conversion unit 108a include a complementary metal oxide semiconductor (CMOS) sensor or a charge coupled device (CCD) sensor including a photodiode. Furthermore, other types of sensors such as an organic photoelectric conversion film may be used as the photoelectric conversion unit 108a.

Then, on a surface 111a side (an upper side) of the substrate 111, an interlayer insulating film 113 is formed. Inside the interlayer insulating film 113, a plurality of wiring layers 112 is arranged. At least any one of a contact or a through electrode (not illustrated) may be provided between the photoelectric conversion unit 108a and the wiring layer 112. Similarly, at least any one of a contact or a through electrode may also be provided between the wiring layers 112.

Whereas, on a second surface 111b side (a lower side) of the substrate 111, a flattening layer 114 is formed. On the flattening layer 114, an underlying insulating layer 116 is formed. Furthermore, a light shielding layer 115 may be formed on a part of the flattening layer 114. The light shielding layer 115 is arranged at or near a boundary of pixels. At least a part of a surface of the light shielding layer 115 may be in contact with the underlying insulating layer 116. Furthermore, an insulating layer 117 is formed on the underlying insulating layer 116. Inside the insulating layer 117, a polarizing element may be formed. Examples of the polarizing element include a wire grid polarizing element having a line-and-space structure. However, a structure and an arrangement direction of the polarizing element are not particularly limited.

On the insulating layer 117 including a plurality of polarizing elements 108b, protective layers 118 and 119 are formed. Moreover, on the protective layer 119, a flattening layer 120 is formed. On the flattening layer 120, a color filter layer 121 is arranged. The color filter layer 121 selectively transmits light in a part of a wavelength band such that a photoelectric conversion unit arranged below can detect light in a predetermined wavelength band.

Then, on the color filter layer 121, an on-chip lens 122 is arranged. In the cross-sectional structure of FIG. 8, the on-chip lens 122 is arranged on the plurality of polarizing elements 108b. However, the plurality of polarizing elements 108b may be arranged on the on-chip lens 122. In this manner, a stacking order of individual layers in the cross-sectional structure of FIG. 8 may be changed.

In the imaging unit 8, the individual photoelectric conversion unit 108a can be formed for every pixel. Each photoelectric conversion unit 108a photoelectrically converts light incident via the display unit 2 and outputs any color signal. That is, it can be said that the imaging unit 8 is a set of a plurality of pixels that performs photoelectric conversion and outputs a color signal. Examples of the color signal include red, green, and blue color signals. However, the color signal outputted from the pixel of the imaging unit 8 may be a color other than the three primary colors of light. For example, the pixel of the imaging unit 8 may output a color signal of at least any one of cyan, magenta, or yellow, which are complementary colors of the three primary colors of light. Moreover, the pixel of the imaging unit 8 may output a color signal corresponding to an intermediate color of individual colors described above, or may output a white color signal.

Figure 9:
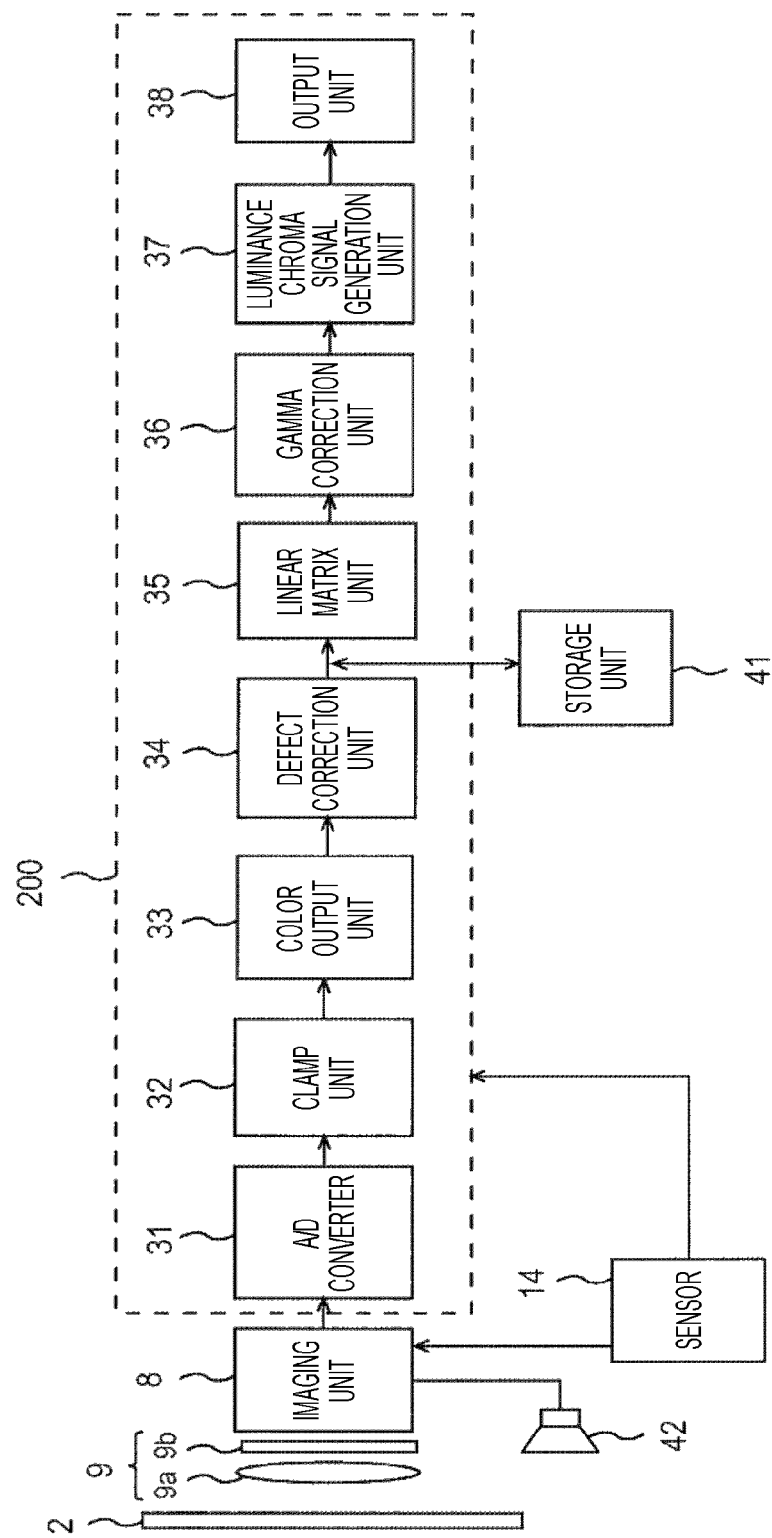
FIG. 9 is a block diagram illustrating an example of an internal configuration of the electronic device according to the present disclosure.

FIG. 9 is a block diagram illustrating an internal configuration of an electronic device according to the present disclosure. The electronic device in FIG. 9 includes the display unit 2, the optical system 9, the imaging unit 8, the sensor 14, an A/D converter 31, a clamp unit 32, a color output unit 33, a defect correction unit 34, a linear matrix unit 35, a gamma correction unit 36, a luminance chroma signal generation unit 37, an output unit 38, a storage unit 41, and a flash 42. For example, the A/D converter 31, the clamp unit 32, the color output unit 33, the defect correction unit 34, the linear matrix unit 35, the gamma correction unit 36, the luminance chroma signal generation unit 37, and the output unit 38 can be mounted on a processing circuit 200.

For example, the optical system 9 includes one or more lenses 9a and an infrared ray (IR) cut filter 9b. However, the IR cut filter 9b may be omitted. As described above, the imaging unit 8 includes a plurality of pixels that performs photoelectric conversion and outputs a color signal. The sensor 14 is a sensor capable of detecting a change (a deformation) in shape of the electronic device 1. The sensor 14 only needs to be able to detect a change in shape in at least any part of the electronic device 1. For example, the sensor 14 is configured to determine whether the electronic device 1 is in an unfolded state (a state of FIGS. 3 and 5) or the electronic device 1 is in a folded state (a state of FIGS. 4 and 6). However, the type of the deformation to be detected by the sensor 14 may be different from this.

For example, the processing circuit 200 may turn on (enable) the imaging unit 8 when the sensor 14 detects that the shape of the electronic device 1 has changed from the unfolded state to the folded state. Furthermore, the processing circuit 200 may start an image-capturing operation by the imaging unit 8 when the sensor 14 detects that the shape of the electronic device 1 has changed from the unfolded state to the folded state. Control of the imaging unit 8 including the image-capturing operation may be performed by hardware of the imaging unit 8 or the processing circuit 200, or may be performed by software operating on the processing circuit 200. Furthermore, control of the imaging unit 8 including the image-capturing operation may be implemented by a combination of the former and the latter.

The color signal outputted from each pixel is inputted to the A/D converter 31. The A/D converter 31 generates digital pixel data digitized on the basis of color signals of a plurality of pixels.

The clamp unit 32 executes processing of defining a black level. For example, the clamp unit 32 subtracts black level data from digital pixel data. The data outputted from the clamp unit 32 is inputted to the color output unit 33. For example, the color output unit 33 classifies the digital pixel data into individual pieces of color information. The defect correction unit 34 performs, for example, correction processing such as removal of a noise component and a signal level. Examples of the noise component include a flare component or a diffracted light component. For example, the defect correction unit 34 can interpolate data for a polarizing pixel by using digital pixel data of surrounding non-polarizing pixels. However, the contents of the correction processing executed by the defect correction unit 34 are not limited.

The linear matrix unit 35 performs matrix operation on color information (for example, RGB). As a result, color reproducibility of an image can be enhanced. The linear matrix unit 35 is also referred to as a color matrix unit. For example, a case is assumed in which an imaging unit including at least any one of a cyan pixel, a yellow pixel, or a magenta pixel is used. In this case, color information of at least any one of cyan, yellow, or magenta is inputted to the linear matrix unit 35. The linear matrix unit 35 can perform matrix operation to convert color information of at least any one of cyan, yellow, or magenta into color information in a red/green/blue (RGB) format.

The gamma correction unit 36 performs gamma correction on color information outputted from the linear matrix unit 35. For example, the gamma correction unit 36 improves visibility of a captured image on the display unit 2 by performing gamma correction according to display characteristics of the display unit 2. The luminance chroma signal generation unit 37 generates a luminance chroma signal on the basis of output data of the gamma correction unit 36. The luminance chroma signal is a signal used for display on the display unit 2. The output unit 38 transfers image data to the display unit 2 and the like.

In accordance with an output signal from the sensor 14, contents of the image processing performed on a captured image may be changed. For example, on an image captured while the electronic device 1 is in the folded state, luminance correction having contents different from those of an image captured while the electronic device 1 is in the unfolded state may be performed. There is a possibility that an incident angle of light changes in accordance with a deformation state of the display unit 2 located above the imaging unit 8. Furthermore, there is also a possibility that an amount of incident light on the imaging unit 8 changes. In particular, in a case where oblique incidence characteristics to the imaging unit 8 change, luminance correction (shading correction) different for every image height may be performed.

The processing circuit 200 may execute processing (FIG. 2 described above) of cropping an area corresponding to an effective angle of view from a captured image. In this case, contents of the processing to be executed may be changed in accordance with an output signal from the sensor 14. For example, in a case where there is a possibility that an adjacent component is included when an image is captured by the imaging unit 8 while the electronic device 1 is in the unfolded state, the processing circuit 200 may crop an area corresponding to the effective angle of view from the captured image and discard an area in which the adjacent component is included, in the captured image. Furthermore, while the electronic device 1 is in the folded state, in a case where the adjacent component is not included when the imaging unit 8 captures an image, the processing circuit 200 may skip the processing of cropping a part of the captured image.

Furthermore, the processing circuit 200 may execute a function of a wide-angle image-capturing mode of generating one image when image-capturing is performed while the electronic device 1 in the folded state is rotated about any axis. Although a case where a rotation axis of the electronic device 1 is the z axis has been described above as an example, the direction of the rotation axis is not limited. The function of the wide-angle image-capturing mode may be implemented by a hardware circuit or may be implemented by a program executed on the processing circuit 200. Furthermore, the function of the wide-angle image-capturing mode may be implemented by a combination thereof.

Note that the processing circuit 200 may execute video image recording processing without being limited to image capturing processing. At least a part of the signal processing of the defect correction unit 34, the linear matrix unit 35, the gamma correction unit 36, or the luminance chroma signal generation unit 37 in FIG. 9 may be executed by a logic circuit in an imaging sensor including the imaging unit 8. Furthermore, at least a part of the signal processing of these may be executed by a signal processing circuit in the electronic device 1. Furthermore, the processing circuit 200 may perform other types of processing such as exposure adjustment processing and edge enhancement processing.

The storage unit 41 is a memory or a storage capable of storing data of an image captured by the imaging unit 8, data of a video image captured by the imaging unit 8, or a program. Examples of the memory include volatile memories such as an SRAM and a DRAM, and non-volatile memories such as a NAND flash memory and a NOR flash memory. Examples of the storage include a hard disk or an SSD. However, the type of the memory or the storage used as the storage unit 41 is not limited. For example, the linear matrix unit 35 can synthesize or correct images by using a plurality of images stored in the storage unit 41. However, components other than the linear matrix unit 35 may synthesize or correct images.

The flash 42 is a light source that irradiates a subject with light in conjunction with an imaging operation in the imaging unit 8. As the flash 42, for example, a white LED can be used. However, the type of the light source used as the flash 42 is not limited. The storage unit 41 and the flash 42 are any components. Therefore, at least any one of these components may be omitted.

For example, an electronic device of the present disclosure includes, for example: a display unit configured to be deformable; and at least one first imaging unit arranged on an opposite side of a display surface of the display unit and configured to image incident light transmitted through the display unit. Here, the camera module 3 described above is an example of the first imaging unit.

In the above description, an example of the (foldable) electronic device including the foldable display unit has been described. However, the electronic device according to the present disclosure may be configured to be deformable in a mode different from this. As shown in the following Modification 1, the electronic device according to the present disclosure may be configured to be deformable into a convex curved surface shape.

Figure 10:
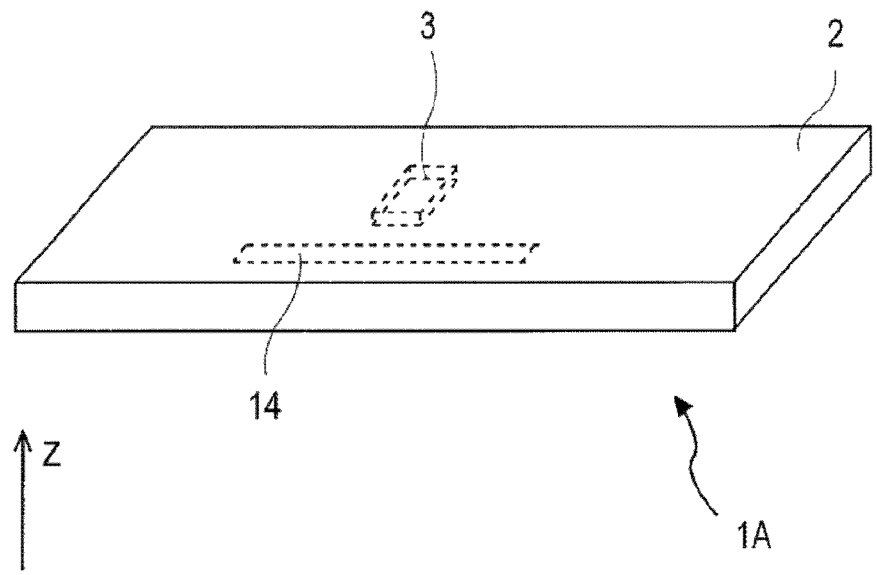
FIG. 10 is a perspective view illustrating an example of a state before bending of an electronic device according to Modification 1.
Figure 11:
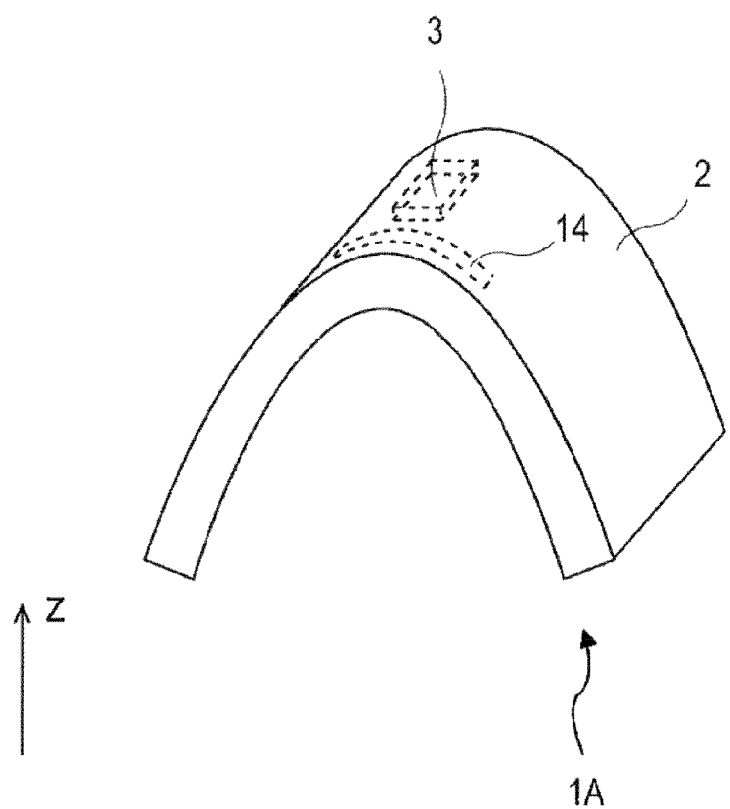
FIG. 11 is a perspective view illustrating an example of a bent state of the electronic device according to Modification 1.

Both of the perspective views of FIGS. 10 and 11 illustrate an example of an electronic device according to Modification 1. As illustrated in FIGS. 10 and 11, an electronic device 1A includes a display unit 2, a camera module 3, and a sensor 14, similarly to the electronic device 1 described above. The display unit 2 is arranged on any surface (in the example of FIG. 10, an upper surface) of the electronic device 1A. Similarly to the display unit 2 of the electronic device 1, the display unit 2 includes a flexible display such as a flexible OLED. Furthermore, the display unit 2 may include, for example, a protective layer formed by a polyimide or a glass sheet. As described above, in the electronic device according to the present disclosure, at least a part of the display unit may be bendable.

Furthermore, the camera module 3 is arranged at a position behind the display unit 2 when the display unit 2 is viewed from the front. Therefore, the camera module 3 performs image-capturing with light transmitted through the display unit 2. As illustrated in FIG. 11, the electronic device 1A can be bent such that a cross section has an inverted U shape (convex upward). That is, the display unit may be bendable into a convex curved surface shape in the electronic device according to the present disclosure. The sensor 14 is mounted in a housing of the electronic device 1A, and detects a deformation of the electronic device 1A. The sensor 14 is, for example, a distortion gauge. However, the sensor 14 may be other type of sensor. The sensor 14 is configured to be able to determine whether the electronic device 1A is in an unbent state (a state in FIG. 10) or the electronic device 1A is in a bent state (a state in FIG. 11).

The first imaging unit (for example, a camera module) of the electric device according to the present disclosure may be arranged at a position corresponding to an inner peripheral side of a convex curved surface formed when the display unit is bent. By changing the state of the electronic device 1A from the state in FIG. 10 to the state in FIG. 11 (the bent state), an angle of view at which an image can be captured by the camera module 3 (the imaging unit 8) can be enlarged. However, depending on a structure of the electronic device 1A in the bent state in FIG. 11, there is a possibility that a restoring force to the state in FIG. 10 is generated. In this case, in order to maintain the electronic device 1A in the state in FIG. 11, the user needs to hold both ends of the electronic device 1A inward with fingers. This may be a restriction on use of the electronic device 1A, in a case where the user desires to continuously perform image-capturing with an enlarged angle of view.

Figure 12:
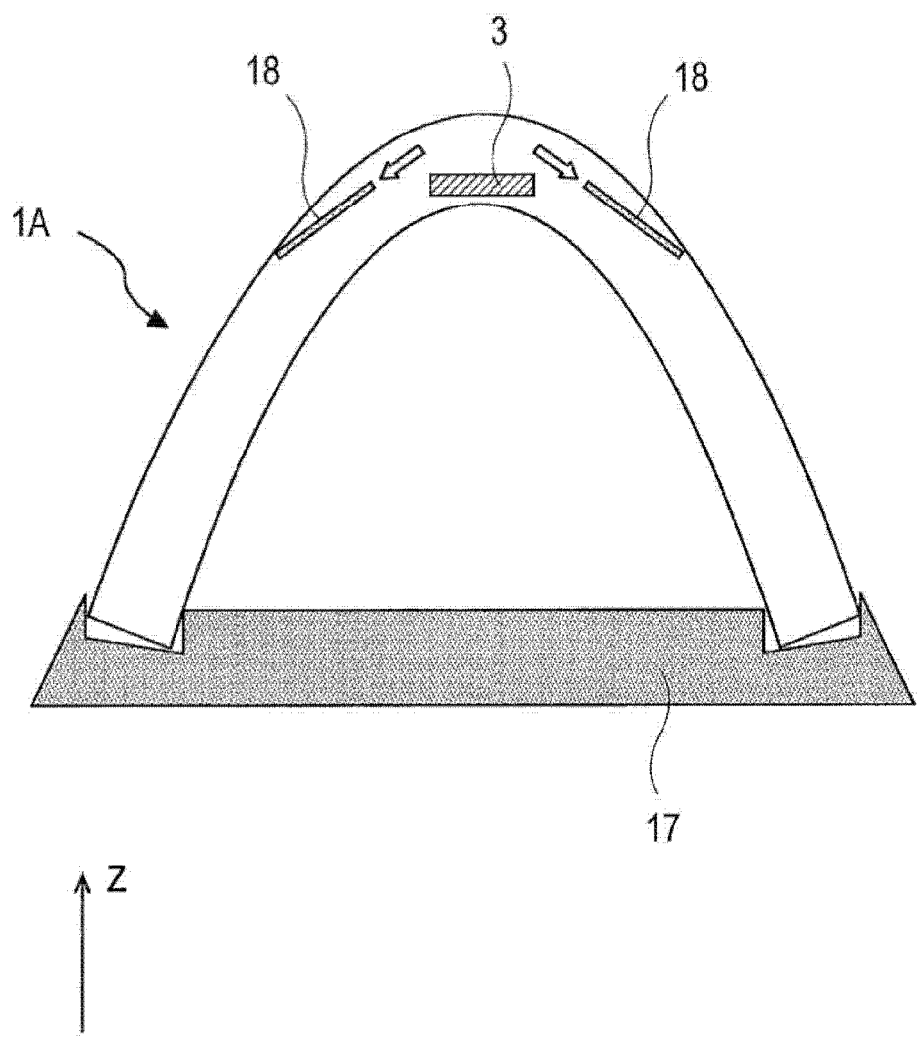
FIG. 12 is a cross-sectional view illustrating an example of a structure of the electronic device and a jig according to Modification 1.

Therefore, as in an example of FIG. 12, the electronic device 1A may be used by being mounted (attached) on a jig 17. In a case where the electronic device 1A is a device operated by a secondary battery mounted inside, the jig 17 may be a battery charger (a stand with a battery charging function). Furthermore, the jig 17 may be a structure that does not have a function as an electric device. By using the jig 17, the electronic device 1A can be maintained in the bent state regardless of the restoring force described above. As a result, the user can capture an image with the electronic device 1A mounted on the jig 17 in a stationary state or capture an image of a desired scene while carrying the electronic device 1A mounted on the jig 17. Note that the shape of the jig 17 illustrated in FIG. 12 is merely an example. Therefore, a jig having a shape different from that in the example of FIG. 12 may be used. By using the jig as illustrated in FIG. 12, it is possible to perform image-capturing in a stable environment such as a tripod by using the electronic device 1A.

There is a possibility that, above or near the camera module 3 of the electronic device 1A, a member is arranged that narrows an angle of view of the camera module 3 (the imaging unit 8) by being included or reduces transmissivity of light in a desired wavelength band. Examples of the former member include the transistor layer 77 and the wiring layer 76 in FIG. 1. Furthermore, examples of the latter member include a circularly polarizing film. Therefore, in order to widen an angle of view of an image captured by the camera module 3 (the imaging unit 8) or improve image quality of an image captured by the camera module 3 (the imaging unit 8), as in the example of FIG. 12, at least a part of a member on a light incident direction side from the camera module 3 (the imaging unit 8) may be moved out of the angle of view of the camera module 3 (the imaging unit 8) when the electronic device 1A is brought into the bent state. For example, in a case where the member above the camera module 3 is a circularly polarizing film 18, as in the example of FIG. 12, a notch may be formed in a portion of the circularly polarizing film 18 above the camera module 3, and the circularly polarizing film 18 may be separated when the electronic device 1A is brought into the bent state. That is, in the electronic device according to the present disclosure, when the display unit is bent, at least a part of a member on the light incident direction side from the first imaging unit (for example, the camera module) may be moved out of an angle of view of the first imaging unit.

The electronic device 1A may be compatible with the wide-angle image-capturing mode. When using the wide-angle image-capturing mode, the user can perform image-capturing while rotating the electronic device 1A about the z axis in the state of FIG. 11 or 12. As a result, the user can obtain a wide-angle image of 180 degrees to 360 degrees with respect to the z axis.

Figure 13:
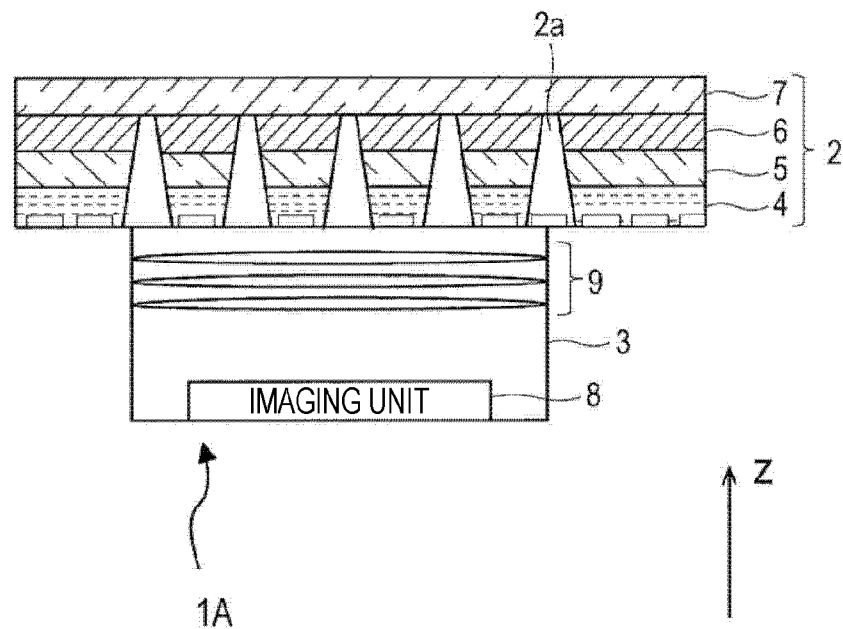
FIG. 13 is a schematic cross-sectional view of the electronic device according to Modification 1.

In a case where the camera module 3 performs image-capturing with light having passed through the display unit 2, as illustrated in the example of FIG. 13, a through hole is provided in a member having a relatively low light transmissivity in the display unit 2, and the image quality of the image captured by the camera module 3 can be improved.

FIG. 13 is a schematic cross-sectional view of a portion including the display unit 2 and the camera module 3 of the electronic device 1A. The display unit 2 in the electronic device 1 of FIG. 13 has a plurality of through holes 2a in a portion overlapping the camera module 3 in a thickness direction. These through holes 2a are provided in a plurality of layers having low transmissivity such as a touch sensor, a circularly polarizing plate 5, and a display panel 4 in the display unit 2. A diameter size of the through hole 2a increases from an upper side to a lower side. That is, the through hole 2a has a tapered shape. As described above, the display unit may have a plurality of tapered through holes in a portion overlapping the first imaging unit in the thickness direction.

Since the plurality of through holes 2a has the tapered shape, a bottom part of the through hole 2a is not closed even in a case where the display unit 2 in FIG. 13 is deformed so as to protrude upward (deformations in FIGS. 11 and 12, for example). Therefore, by adopting the configuration illustrated in FIG. 13, image quality of an image captured when the electronic device 1A is in the bent state can be improved.

Figure 14:
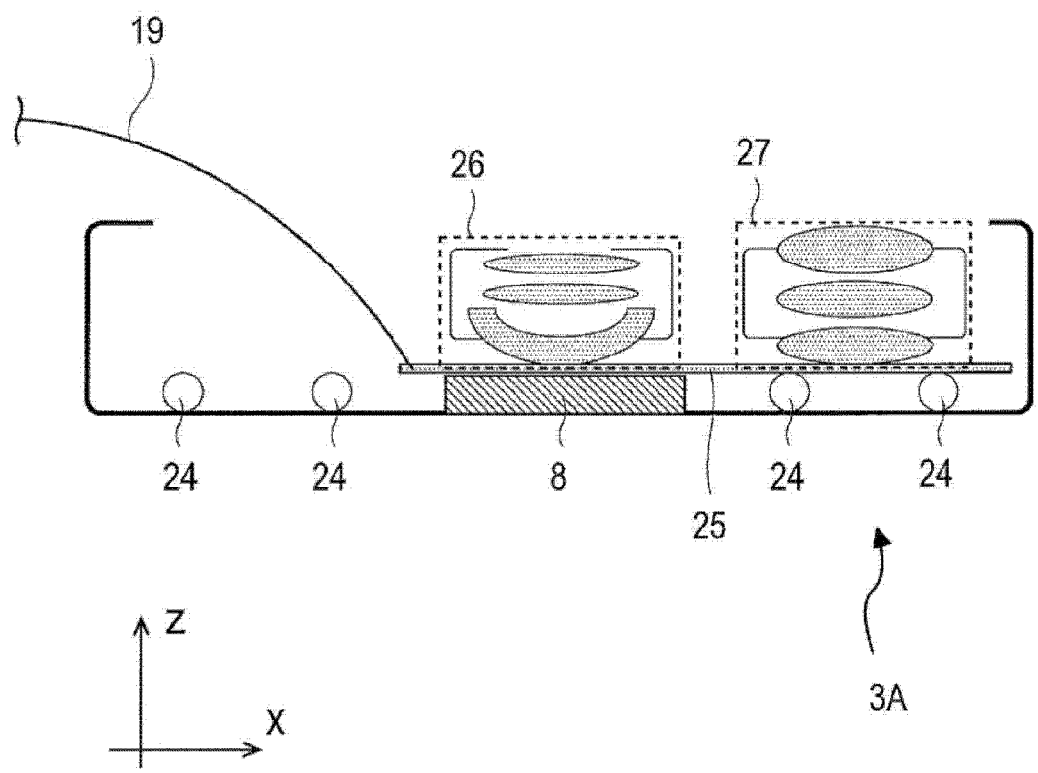
FIG. 14 is a cross-sectional view illustrating an example of a camera module capable of switching an optical system to be used in accordance with a bent state of the electronic device.
Figure 15:
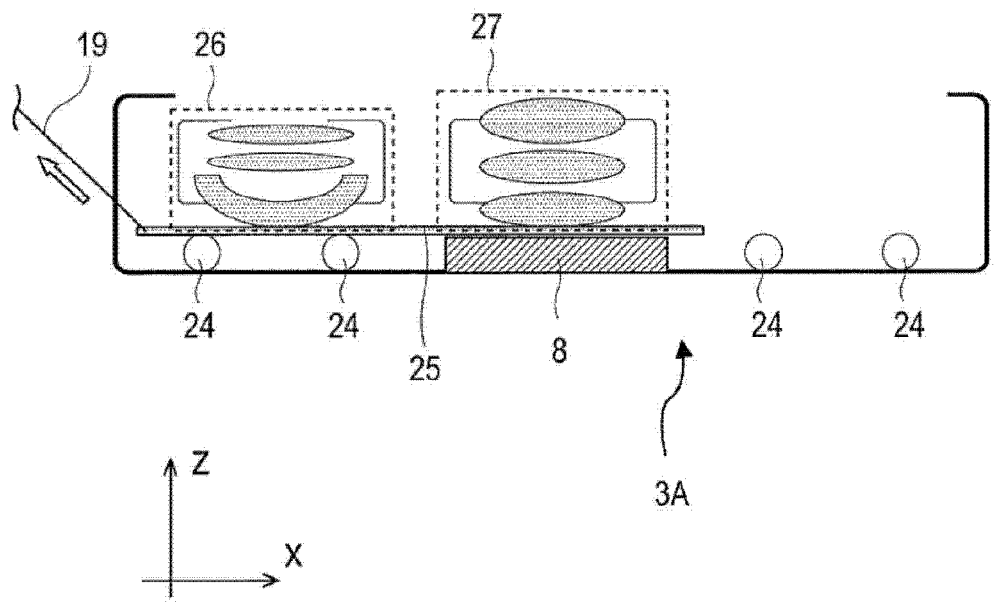
FIG. 15 is a cross-sectional view illustrating an example of the camera module capable of switching an optical system to be used in accordance with a bent state of the electronic device.

Cross-sectional views of FIGS. 14 and 15 illustrate an example of a camera module capable of switching an optical system to be used, in accordance with a bent state of the electronic device.

A camera module 3A includes an imaging unit 8, a table 25, a first lens system 26, a second lens system 27, a sliding mechanism 24, and a wire 19. The table 25 is a plate-shaped structure formed by a material capable of transmitting an electromagnetic wave (for example, visible light) in a wavelength band to be detected by the imaging unit 8. The first lens system 26 and the second lens system 27 are placed on an upper side of the table 25. The first lens system 26 and the second lens system 27 may be fixed on the table 25.

The first lens system 26 is a lens system used when the electronic device 1A is in the unbent state (the state in FIG. 10). Whereas, the second lens system 27 is a lens system used when the electronic device 1A is in the bent state (the state in FIG. 11). The first lens system 26 and the second lens system 27 are configured to condense incident light on the imaging unit 8.

The table 25 is movable in a horizontal direction (an x axis) by the sliding mechanism 24 provided below. The sliding mechanism 24 in FIGS. 14 and 15 is formed by a plurality of rollers. However, a sliding mechanism of a different structure or method may be used. The table 25 is connected to a frame of a housing of the electronic device 1A via the wire 19. In the unbent state (the state in FIG. 10) of the electronic device 1A, the wire 19 is relaxed, so that the table 25 is located on a right side (an x-axis positive direction side), and the first lens system 26 is arranged above the imaging unit 8 (FIG. 14). Whereas, in the bent state (the state in FIG. 11) of the electronic device 1A, a distance between the camera module 3A and a fixing point of the wire 19 in the frame of the housing of the fixed electronic device 1A becomes long. At this time, since the wire 19 is pulled by the frame of the housing of the electronic device 1A, the table 25 moves toward a left side (an x-axis negative direction side), and the second lens system 27 is arranged above the imaging unit 8 (FIG. 15).

As the wire 19, for example, a metal wire, a nylon line, a fluorocarbon line, or a PE line can be used. However, the material of the wire 19 is not limited. Furthermore, as the wire 19, a tape-shaped material, a chain, or the like may be used instead of a linear material.

By using the camera module having the configuration illustrated in FIGS. 14 and 15, images can be captured using different lens systems when the electronic device (the display unit) is deformed and when the electronic device (the display unit) is not deformed. In this way, the first imaging unit of the electronic device according to the present disclosure may be configured such that the optical system used for image-capturing can be switched in accordance with the shape of the display unit. Note that, the optical system used for image-capturing in the imaging unit may be switched in accordance with the shape of the electronic device (the display unit) by using a configuration different from the configuration illustrated in FIGS. 14 and 15. However, the electronic device according to the present disclosure may not be configured to always switch the optical system used for image-capturing in the imaging unit in accordance with the shape of the electronic device (the display unit).

In FIGS. 5 and 6 described above, an example has been described in which the electronic device is mounted with the camera module (the imaging unit) that maintains an original shape regardless of a deformation of the display unit (does not have remarkable elasticity and flexibility). However, as described below, a camera module (an imaging unit) capable of changing a shape according to a deformation of the display unit may be used.

Figure 16:
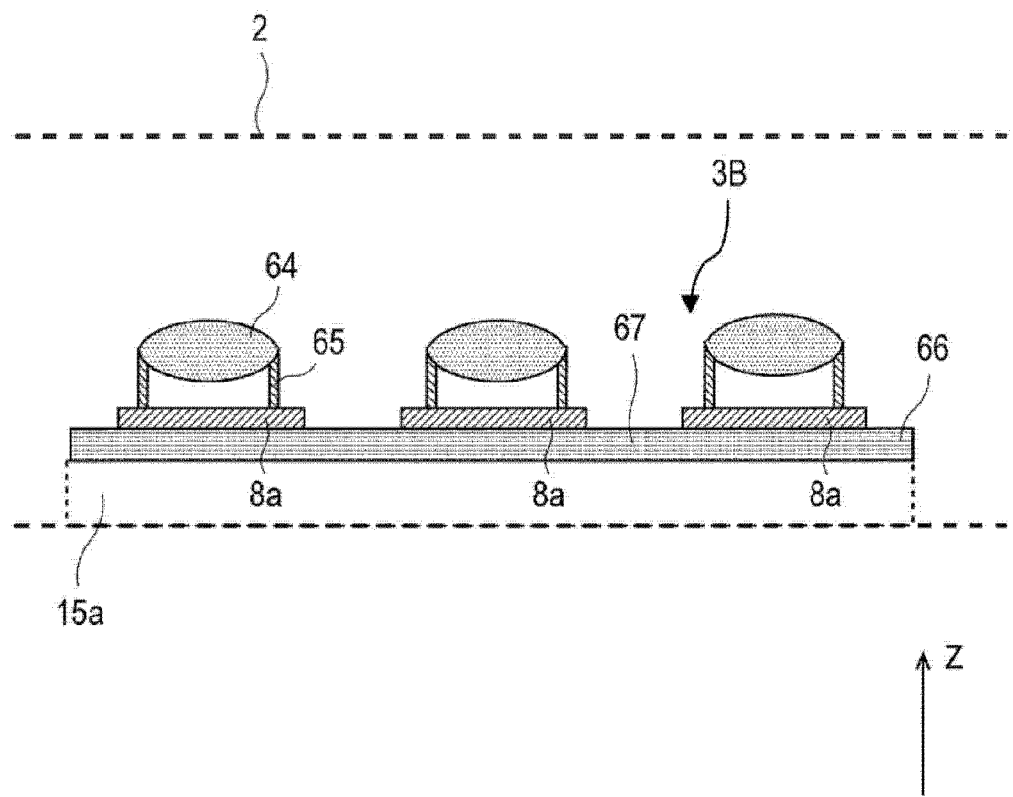
FIG. 16 is a cross-sectional view illustrating an example of a bendable electronic device and a camera module.

FIG. 16 is a cross-sectional view illustrating an example of a bendable camera module. A camera module 3B illustrated in FIG. 16 includes a plurality of imaging units 8a. The plurality of imaging units 8a is mounted on a support member 66. In the support member 66, at least a connection unit 67 between the imaging units 8a is formed by a material having elasticity and flexibility. The support member 66 may include at least any one of a wiring layer or a transistor layer, which are not illustrated. The plurality of imaging units 8a is connected to a processing circuit 200 in a subsequent stage via at least any one of the wiring layer or the transistor layer.

Furthermore, a lens 64 is mounted above each imaging unit 8a. The lens 64 is supported above the imaging unit 8a by a support unit 65, for example. The lens 64 condenses incident light on the corresponding imaging unit 8a. Note that, instead of the lens 64, an optical system including a plurality of lenses may be mounted above the imaging unit 8a. The camera module 3B is fixed to a housing of the electronic device via a plate-shaped member 15a. The plate-shaped member 15a is formed by a material (a material having elasticity and flexibility) that is deformable in accordance with a deformation of the electronic device (the display unit 2).

Figure 17:
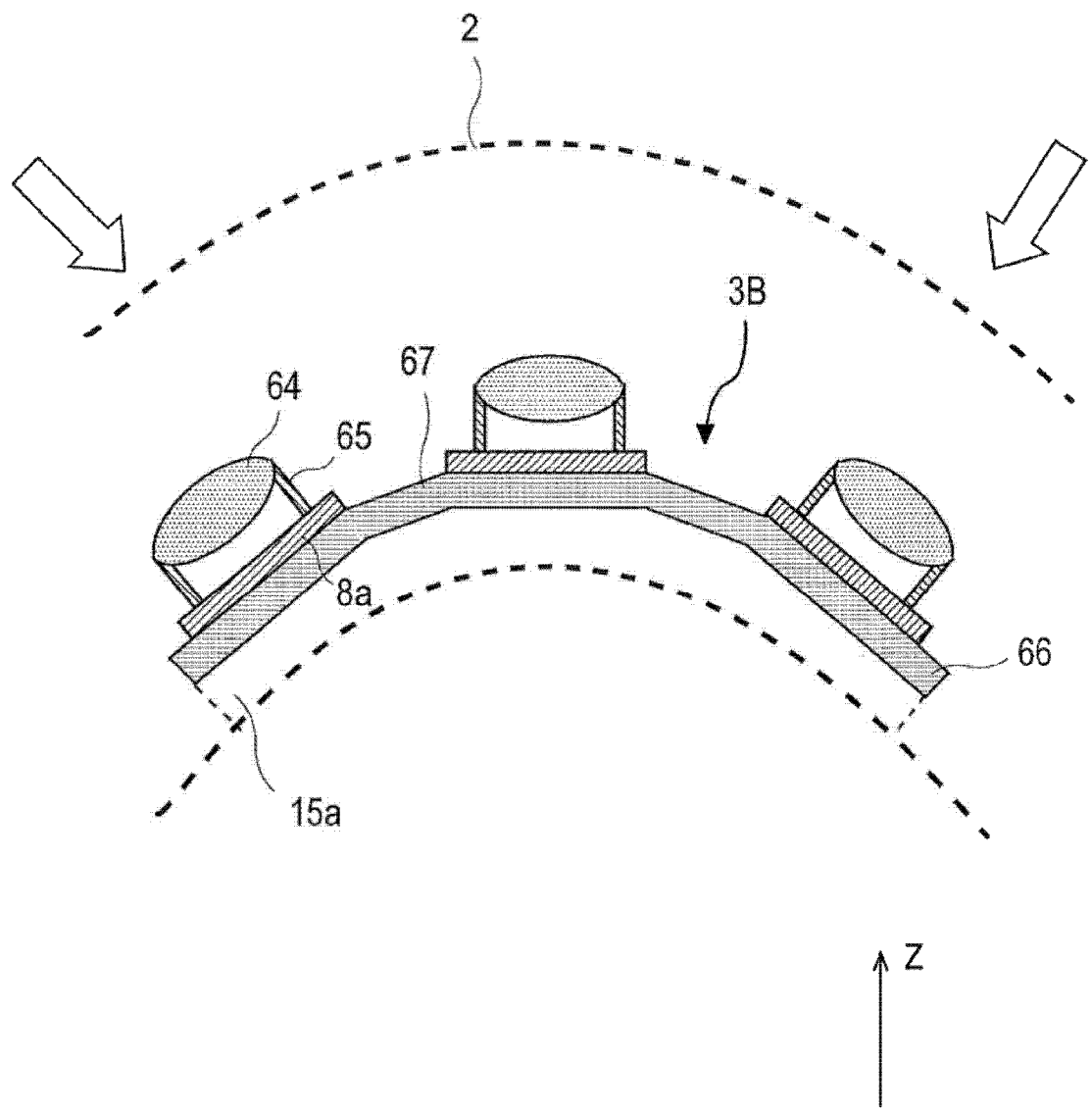
FIG. 17 is a cross-sectional view illustrating an example of the bendable electronic device and the camera module.

FIG. 17 illustrates a shape of the camera module 3B when the electronic device (the display unit 2) is brought into a bent state. As illustrated in FIG. 17, in accordance with a deformation of the electronic device (the display unit 2), the connection unit 67 of the support member 66 extends, and individual imaging units 8a are directed in different directions. By synthesizing images captured by the individual imaging units 8a in the processing circuit 200, it is possible to obtain an image with a wider angle of view than when the image is captured by one imaging unit. As described above, in the electronic device according to the present disclosure, a second image having a larger angle of view than a first image may be generated by synthesizing the first images captured by the plurality of imaging units. The electronic device according to the present disclosure may include a plurality of first imaging units connected by a connection unit having elasticity and flexibility.

In the electronic device 1 illustrated in FIGS. 3 to 6, the camera module 3 has been arranged on the opposite side of the second area 22 of the display unit 2. However, in the electronic device according to the present disclosure, the camera module (the imaging unit) may be arranged in an area different from this.

Figure 18:
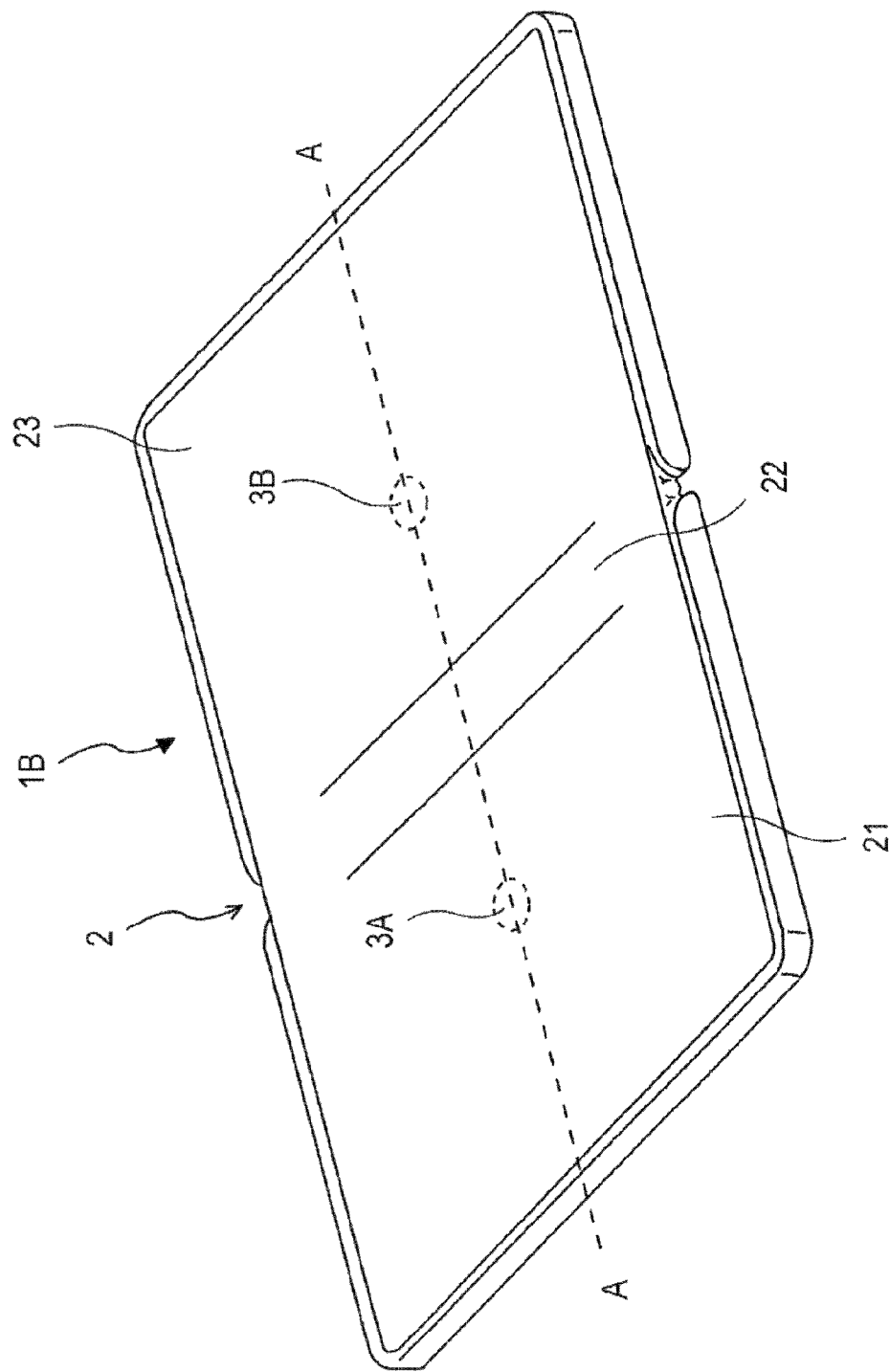
FIG. 18 is a perspective view illustrating an example of an unfolded state of an electronic device according to Modification 2.
Figure 19:
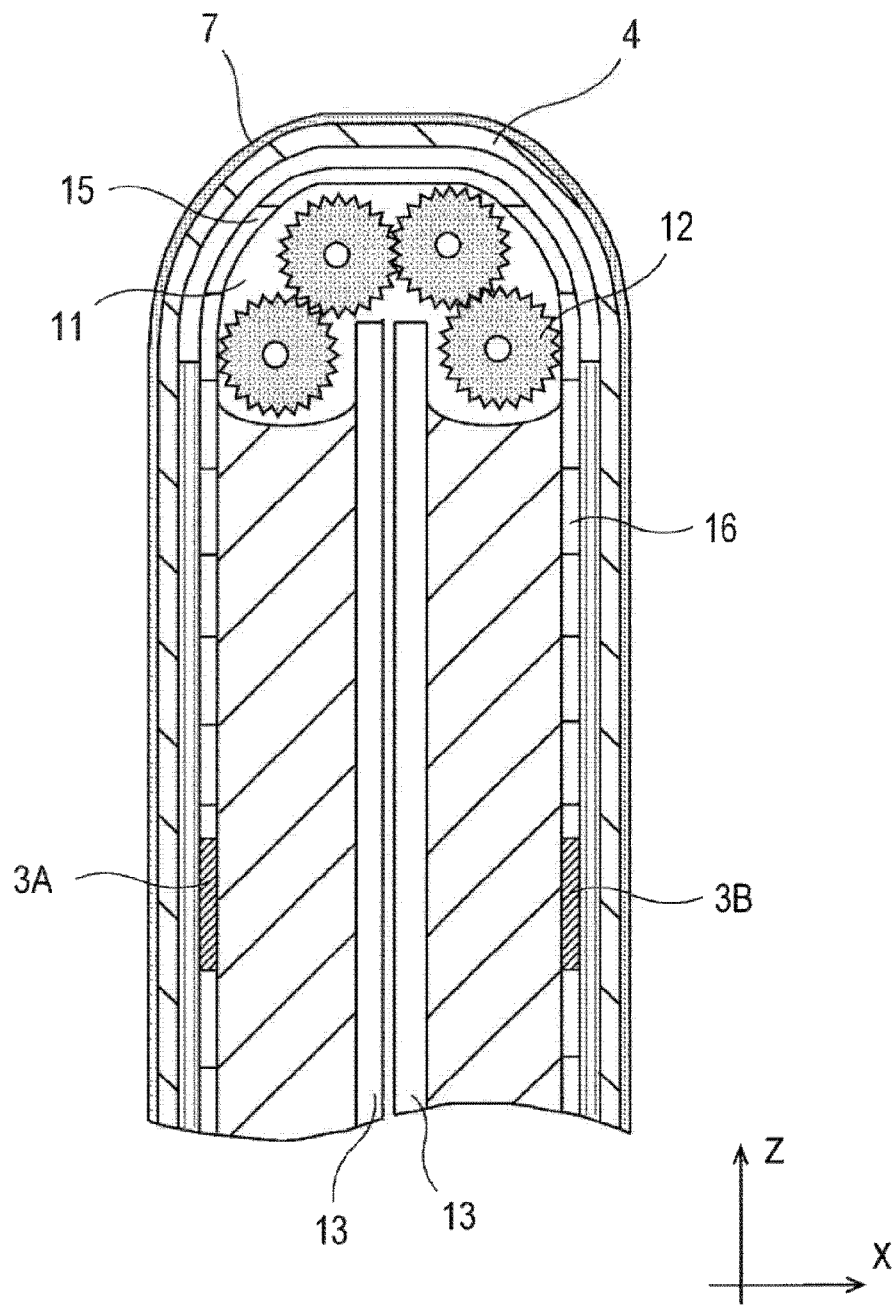
FIG. 19 is a cross-sectional view illustrating an example of a folded state of the electronic device according to Modification 2.

A perspective view of FIG. 18 illustrates an example of an unfolded state of an electronic device according to Modification 2. Furthermore, a cross-sectional view of FIG. 19 illustrates an example of a folded state of the electronic device according to Modification 2. An electronic device 1B illustrated in FIGS. 18 and 19 is a foldable electronic device similarly to the electronic device 1 described above. However, the electronic device 1B is different from the electronic device 1 in the number and arrangement of camera modules. In the electronic device 1B, a camera module 3A is arranged on an opposite side of a first area 21 of a display unit 2. Furthermore, in the electronic device 1B, a camera module 3B is arranged on an opposite side of a third area 23 of the display unit 2. That is, the camera module 3A performs image-capturing with light having passed through the first area 21 of the display unit 2. Furthermore, the camera module 3B performs image-capturing with light having passed through the third area 23 of the display unit 2.

In this way, in the electronic device according to the present disclosure, the first imaging unit (for example, the camera module) may be arranged on each of the opposite side of the display surface in the first area and the opposite side of the display surface in the third area.

As illustrated in FIG. 19, when the electronic device 1B is brought into the folded state, the camera module 3A and the camera module 3B face opposite directions. An image captured by the camera module 3A and an image captured by the camera module 3B can be synthesized into one image by a processing circuit 200 in a subsequent stage. As a result, it is possible to obtain an image with a wider angle of view than when one camera module is used.

Furthermore, the electronic device 1B may be compatible with the wide-angle image-capturing mode. When using the wide-angle image-capturing mode, the user performs image-capturing while rotating the electronic device 1B about the z axis in the state of FIG. 19. As a result, the user can capture a wide-angle image of 180 degrees to 360 degrees with respect to the z axis.

In this way, an electronic device according to the present disclosure may include a display unit configured to be deformable, and a third imaging unit and a fourth imaging unit each configured to image incident light transmitted through the display unit. For example, the above-described camera modules 3A and 3B correspond to the third imaging unit and the fourth imaging unit. Here, the third imaging unit is configured to perform imaging at a third angle of view. Furthermore, the fourth imaging unit is configured to perform imaging at a fourth angle of view. In a case where the display unit is in a first shape, the third angle of view and the fourth angle of view may partially overlap each other. Furthermore, in a case where the display unit is in a second shape, the third angle of view and the fourth angle of view may not overlap each other in the electronic device.

Furthermore, the electronic device according to the present disclosure may further include a processing circuit configured to synthesize an image obtained by the third imaging unit and an image obtained by the fourth imaging unit in a case where the display unit is in the second shape.

Note that, in FIGS. 18 and 19, the foldable electronic device including the plurality of camera modules that captures an image with light transmitted through the display unit has been described. However, the electronic device may be deformed in a mode different from this. For example, a plurality of camera modules that captures an image with light transmitted through the display unit may be mounted on a bending type electronic device.

Figure 20:
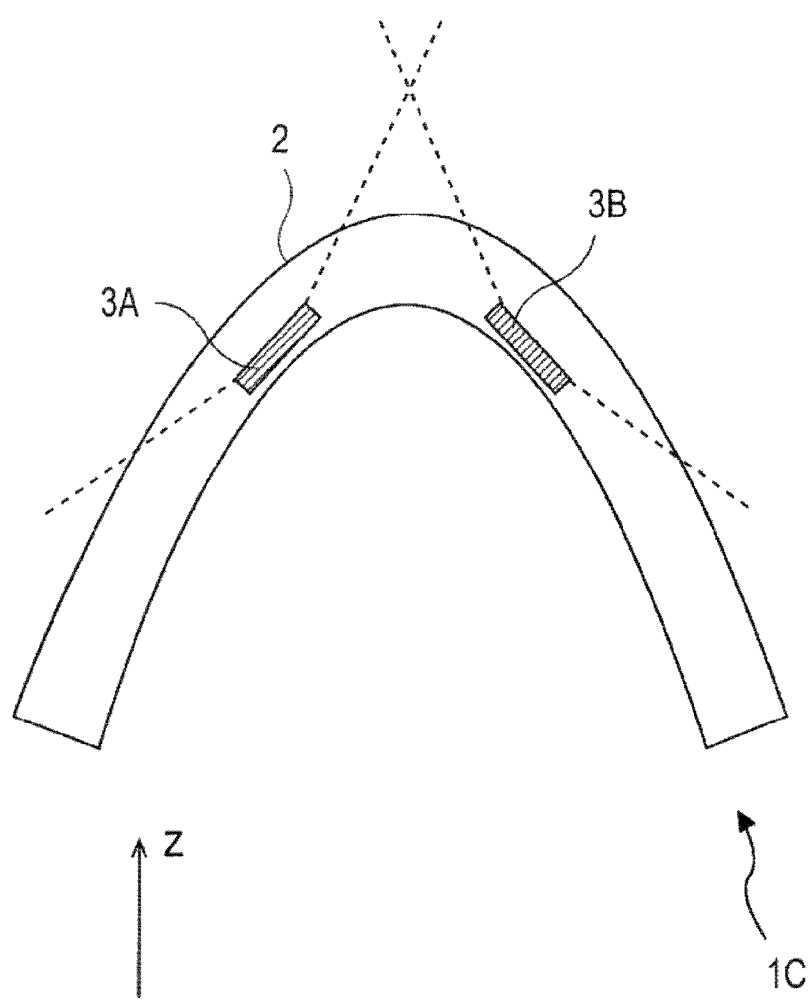
FIG. 20 is a view illustrating an example of an angle of view at which an image can be captured by an electronic device according to Modification 3.

FIG. 20 is a view illustrating an example of an angle of view at which an image can be captured by an electronic device according to Modification 3. An electronic device 1C of FIG. 20 is configured to be bendable into a convex curved surface shape similarly to the electronic device 1A described above. The electronic device 1C includes a camera module 3A and a camera module 3B arranged at different positions on an opposite side of a display surface of a display unit 2. As illustrated in FIG. 20, when the electronic device 1C is brought into a bent state, the camera module 3A and the camera module 3B individually face different directions. An image captured by the camera module 3A and an image captured by the camera module 3B can be synthesized into one by a processing circuit 200 in a subsequent stage. Therefore, when the electronic device 1C is used, it is possible to capture an image with a wider angle of view than when one camera module is used.

Figure 21:
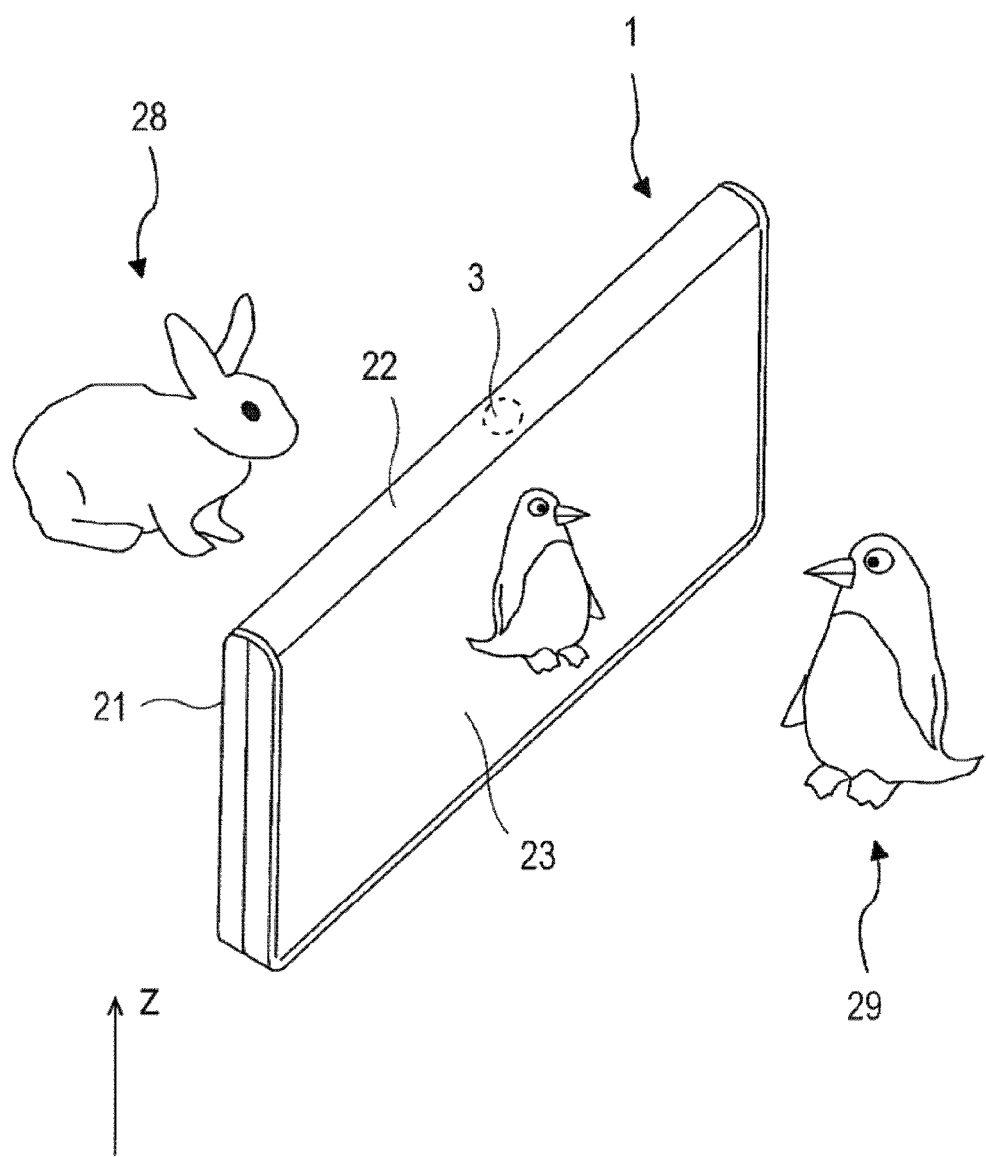
FIG. 21 is a view illustrating an example of an image displayed on the electronic device according to the present disclosure.

FIG. 21 illustrates an example of an image displayed in the electronic device according to the present disclosure. The electronic device 1 of FIG. 21 is in the folded state. Then, the electronic device 1 is installed on a plane such that the second area 22 of the display unit 2 faces upward.

The output unit 38 of the processing circuit 200 can determine contents to be displayed in individual areas of the display unit 2 of the electronic device 1. Here, examples of the contents include an image, graphics, text, a moving image, or a combination thereof. For example, in a case where an image is captured by the camera module 3 (the imaging unit 8), the output unit 38 of the processing circuit 200 can display the image or contents generated on the basis of the image, on the display unit 2. The contents generated on the basis of the captured image may be, for example, an image in which at least any one of a shape, a size, a color, or brightness of the image is corrected, may be a combination of a plurality of images, or may be graphics or a moving image generated on the basis of the image. That is, the electronic device according to the present disclosure may further include a processing circuit configured to output, to the display unit, a first image based on the captured image of the first imaging unit.

Furthermore, in a case where an image is captured by the camera module 3 (the imaging unit 8), the output unit 38 of the processing circuit 200 can determine a position and a range of the display unit 2 in which each portion of the image is displayed, in accordance with an angle of view in the image. That is, the processing circuit in this example is configured to determine a position and a range of the display unit on which each portion of the first image is displayed, in accordance with the angle of view in the captured image. For example, in the example of FIG. 21, a subject 28 (in an example, an object shaped like a young rabbit) is arranged at a position facing the first area 21 of the display unit 2 of the electronic device 1. Furthermore, a subject 29 (in an example, an object in a shape of a young penguin) is arranged at a position facing the third area 23 of the display unit 2 of the electronic device 1.

In this case, the output unit 38 of the processing circuit 200 can display a portion in which the subject 29 is shown in an image captured by the camera module 3 (the imaging unit 8), on the third area 23 of the display unit 2. Similarly, the output unit 38 of the processing circuit 200 can display a portion in which the subject 28 is shown in the image captured by the camera module 3 (the imaging unit 8), on the first area 21 of the display unit 2. As described above, the output unit 38 of the processing circuit 200 may correct a shape, a size, a color, and brightness of a corresponding portion of the image, and perform display on the areas of the display unit 2. Furthermore, in a case where a part of the subject is outside the angle of view or the image is unclear when the subject is displayed in at least any one area of the display unit 2, the processing circuit 200 may complement at least a part of the subject. Furthermore, in a case where a missing part of the subject occurs in the image, the processing circuit 200 may enlarge to display the subject so that the missing part and the vicinity thereof are not displayed on the display unit 2.

By performing the processing illustrated in FIG. 21, a surrounding scene or object is displayed on the display unit 2 of the electronic device 1 in a clear and easily viewable state. Therefore, the user can use the electronic device 1 like a mirror. Note that, in accordance with the lapse of time, the electronic device 1 may change the subject displayed in each area of the display unit 2 or the contents of processing performed on the image. As a result, in a case where image-capturing is performed while the electronic device 1 is rotated about the z axis or while the electronic device 1 is moved, contents displayed in individual areas of the display unit 2 of the electronic device 1 can be updated in real time.

Note that it is not limited to the foldable electronic device 1 that can perform the processing illustrated in FIG. 21. For example, the bending type electronic device 1A (FIGS. 11 and 12) may execute the processing of FIG. 21.

Figure 22:
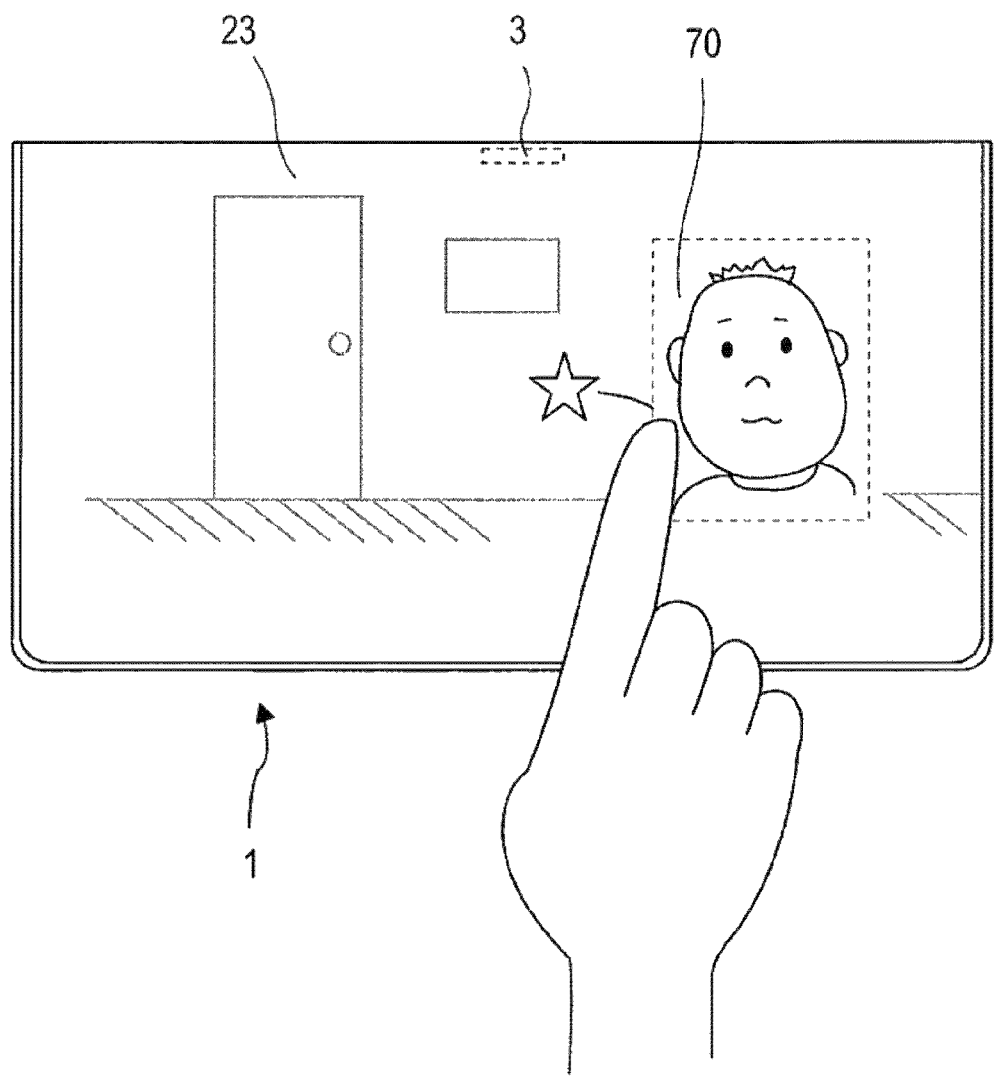
FIG. 22 is a view illustrating an example of a subject selection operation in the electronic device according to the present disclosure.

FIG. 22 illustrates an example of a subject selection operation in the electronic device according to the present disclosure. The electronic device 1 of FIG. 22 is also in the folded state, and the electronic device 1 is installed on a plane such that the second area 22 of the display unit 2 faces upward. In the third area 23 of the display unit 2 of the electronic device 1 of FIG. 22, a partial angle of view of an image captured by the camera module 3 (the imaging unit 8) is displayed. Specifically, in the third area 23 of the display unit 2, a portion including a range facing the third area 23 of the display unit 2 in the angle of view at which an image can be captured by the camera module 3 (the imaging unit 8) is displayed.

In the third area 23 of the display unit 2 in FIG. 22, a door, a floor, a wall, and a child's face, which are subjects of the camera module 3 (the imaging unit 8), are displayed. As described above, the electronic device 1 can display a plurality of subjects within a wide angle of view on the display unit 2. The electronic device according to the present disclosure may perform a selective operation on at least any one of a plurality of subjects subjected to image-capturing by the imaging unit. For example, the processing circuit 200 may be configured to perform image recognition to detect a subject in a captured image or a recorded video image. At this time, the detection of the subject in the captured image or the recorded video image may be face recognition. In general, as the angle of view at which an image can be captured by the camera module 3 (the imaging unit 8) is wider, the number of detectable subjects becomes larger.

The display unit of the electronic device according to the present disclosure may include a touch panel. Furthermore, the processing circuit may be configured to detect at least any subject included in the image captured by the imaging unit.

For example, in the state of FIG. 22, it is assumed that the electronic device 1 records a first video image by using the camera module 3 (the imaging unit 8). At this time, the first video image recorded by the electronic device 1 may be a video image at an angle of view of 180 degrees to 360 degrees according to equidistant cylindrical projection. However, the type and the angle of view of the first video image are not limited. In FIG. 22, the user taps an area where a child's face is displayed among the plurality of subjects displayed on the display unit 2. At this time, the processing circuit 200 detects that the user has selected the child's face as the subject to be recorded. Then, the processing circuit 200 starts recording of a second video image obtained by cropping a partial angle of view of the camera module 3 (the imaging unit 8) including an area 70 having the child's face (selection of a recording subject). Processing in a case where continuous image-capturing (continuous capturing) of a plurality of images is performed instead of video image recording is also similar to the above.

Figure 23:
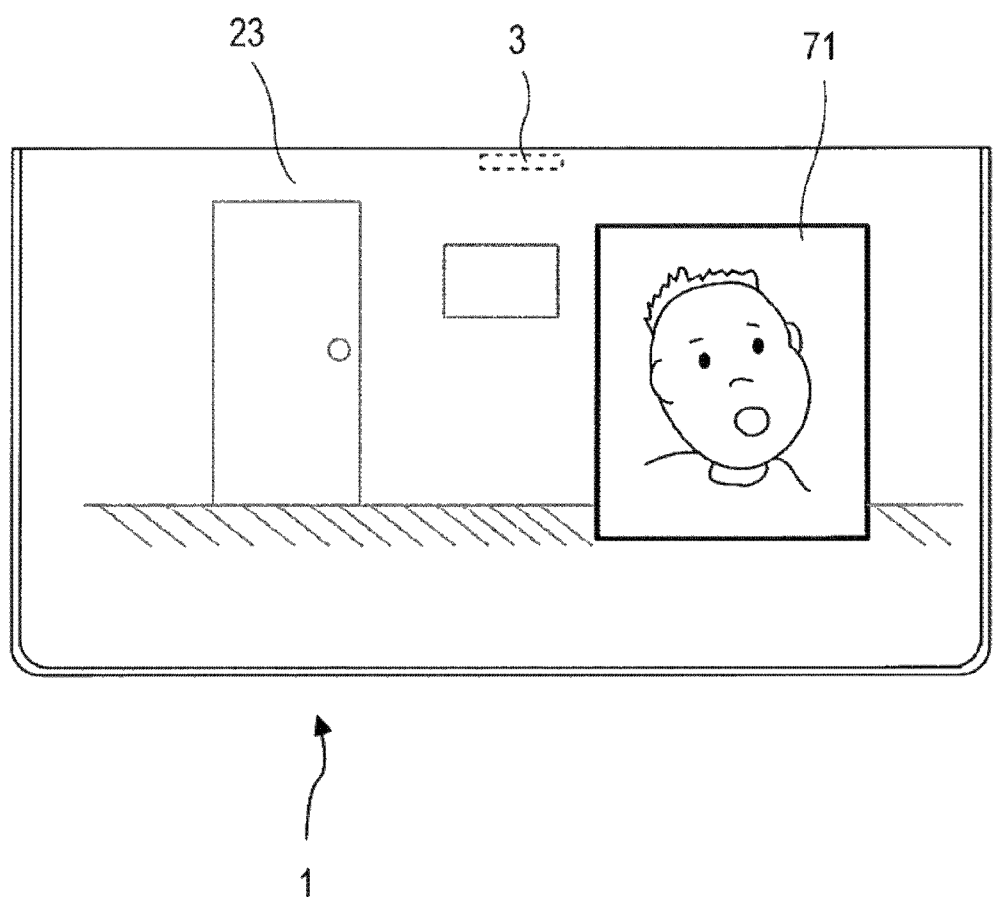
FIG. 23 is a view illustrating an example of screen display and an image-capturing operation of a selected subject.

In this way, the electronic device 1 may record two video images in parallel. Note that recording of the second video image may be started at a timing when the electronic device 1 is not recording the first video image. Furthermore, the processing circuit 200 may be configured to track and record the subject selected by the user. In this case, as illustrated in FIG. 23, the electronic device 1 may perform image-capturing or recording at an angle of view in a different direction with the lapse of time, in accordance with a change in relative direction in which the subject is located. As a result, for example, it is possible to capture or record an image of a child moving while playing. Moreover, it is also possible to capture or record an image of various moving objects or animals in a tracking manner. In general, as the angle of view at which an image can be captured by the camera module 3 (the imaging unit 8) is wider, a period during which the subject can be tracked becomes longer.

In this way, the processing circuit of the electronic device according to the present disclosure may be configured to detect that an area in which a subject is displayed on the display unit is touched, and start recording the first video image obtained by cropping a partial angle of view of the first imaging unit including the area. Furthermore, the processing circuit may be configured to record the second video image having a larger angle of view than the first video image in parallel with recording of the first video image.

In the above description, an example of the operation of selectively capturing an image of a specific subject within an angle of view of the camera module 3 (the imaging unit 8) has been described. However, the electronic device according to the present disclosure may selectively display a specific subject within an angle of view of the camera module 3 (the imaging unit 8), on the display unit.

For example, as in the example of FIG. 22, in a case where the user taps the area where the child's face is displayed among the plurality of subjects displayed on the display unit 2, the processing circuit 200 detects that the user has selected the child's face as the subject to be displayed. Then, the processing circuit 200 displays an image obtained by cropping a partial angle of view of the camera module 3 (the imaging unit 8) including the area 70 having the child's face, on at least any one portion of the display unit 2 (selection of a display subject). The user may perform the selection operation of the display subject described above at a timing when the electronic device 1 is recording the first video image by using the camera module 3 (the imaging unit 8). As a result, an image obtained by cropping the partial angle of view of the camera module 3 (the imaging unit 8) can be displayed on at least any portion of the display unit 2, during a period in which the electronic device 1 is recording the wide-angle first video image.

As described above, the processing circuit of the electronic device according to the present disclosure may be configured to detect that an area where a subject is displayed on the display unit is touched, and output the second image obtained by cropping a partial angle of view of the first imaging unit including the area, to at least any part of the display unit.

As illustrated in FIG. 23, also in a case where the selection operation for the display subject is performed, the electronic device 1 can capture an image of an angle of view in a different direction with the lapse of time and display the captured image in at least any area of the display unit 2, in accordance with a change in relative direction in which the subject is located. As a result, for example, a state of a child moving while playing can be continuously displayed on the display unit 2. Moreover, images obtained by tracking various moving objects or animals can be displayed on the display unit 2. In this way, the user can continuously observe and view a state of the subject displayed on the display unit 2. For example, as illustrated in FIG. 23, the user can enjoy a change in expression of the child who is the subject.

Note that the electronic device according to the present disclosure may execute the above-described processing of selecting a recording subject and processing of selecting a display subject in parallel. In this case, in accordance with a change in relative direction in which the subject is located, the electronic device 1 performs recording at an angle of view in a different direction with the lapse of time, and further displays a video image recorded in real time in at least a part of the areas of the display unit 2.

In the examples of FIGS. 22 and 23, the case where the recording subject is selected and the case where the display subject is selected, by using the electronic device 1 of the folding type, have been described. However, an electronic device of a type other than the folding type may be used. For example, at least any one of the selection of the recording subject or the selection of the display subject may be performed by using the electronic device 1A of the bending type (FIGS. 11 and 12).

Figure 24:
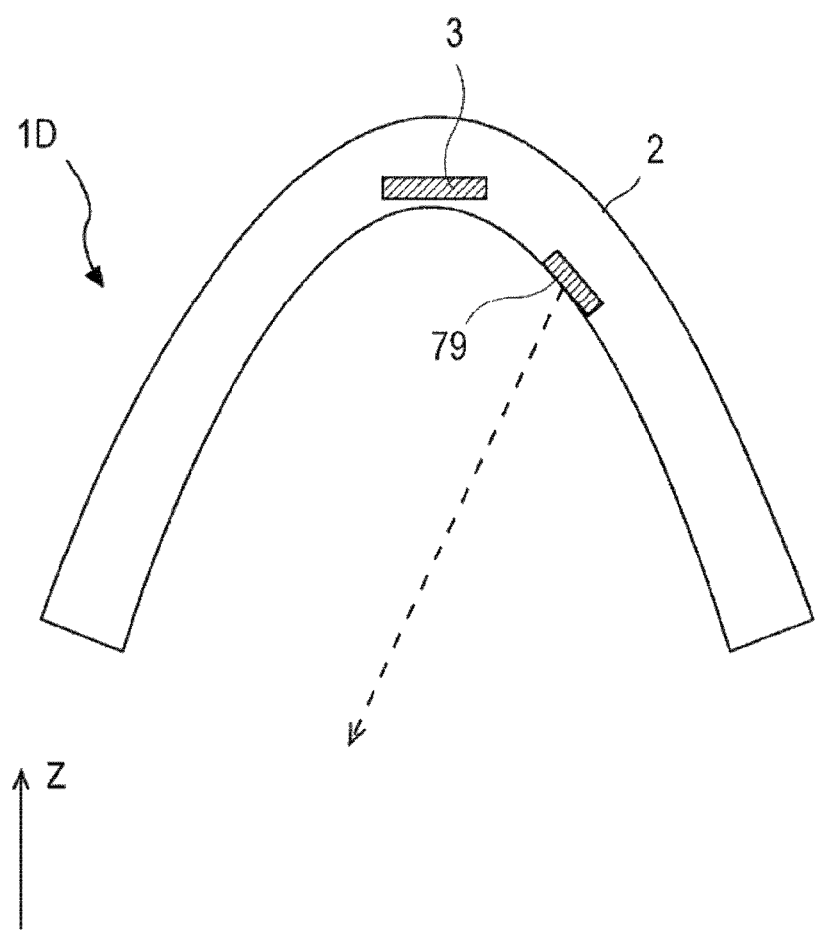
FIG. 24 is a cross-sectional view illustrating an example of an electronic device according to Modification 4.

FIG. 24 is a cross-sectional view illustrating an example of an electronic device according to Modification 4. An electronic device 1D of FIG. 24 corresponds to one in which a camera module 79 is mounted on a surface on a side opposite to the display unit 2 in the electronic device 1A illustrated in FIGS. 10 to 13. An imaging unit in the camera module 79 is connected to, for example, the processing circuit 200 described above. Since the camera module 79 is on the surface on the side opposite to the display unit 2, it is also referred to as a rear camera. As described above, the electronic device according to the present disclosure may further include a second imaging unit arranged on a surface on a side opposite to the display unit.

By using the camera module 79 of the electronic device 1A, it is possible to capture an image of a subject in a direction opposite to the display surface of the display unit 2, which is difficult to capture an image by the camera module 3. The processing circuit 200 may use the image captured by using the camera module 79 to complement a defective portion or a portion of degraded image quality in an image captured by the camera module 3. Furthermore, the processing circuit 200 may synthesize an image captured by using the camera module 79 and an image captured by the camera module 3 to generate one image.

As described above, by using the electronic device according to the present disclosure, it is possible to implement image-capturing with a wide angle of view with a compact housing. As a result, it is possible to capture a powerful image or an image including the entire subject having a large size without using expensive and specialized equipment, and it is possible to meet the needs of the market. Furthermore, in the electronic device according to the present disclosure, it is possible to mount a camera with a fisheye lens or a camera with a wide-angle lens, without increasing a size of a housing or forming a protruding portion in the housing.

Furthermore, in the electronic device according to the present disclosure, since the imaging unit is mounted on the opposite side of the display surface of the display unit, a width of a bezel can be narrowed or bezel-less can be achieved. Therefore, it is possible to use a large-screen display unit in the electronic device, and the user can enjoy a powerful image with high resolution. In the electronic device according to the present disclosure, an angle of view at which an image can be captured by the imaging unit can be expanded with a deformation of the display unit. Therefore, even if the imaging unit is mounted inside the housing, an adjacent component moves with a deformation of the display unit and/or the housing, so that it is possible to prevent the adjacent component from being included at the time of image-capturing.

Furthermore, in the electronic device according to the present disclosure, it is possible to simultaneously capture an image of a plurality of subjects by using a wide angle of view, and to show an image of a specific subject on the display unit. In this way, by using the electronic device according to the present disclosure, various experiences can be provided to the user.

Figure 25:
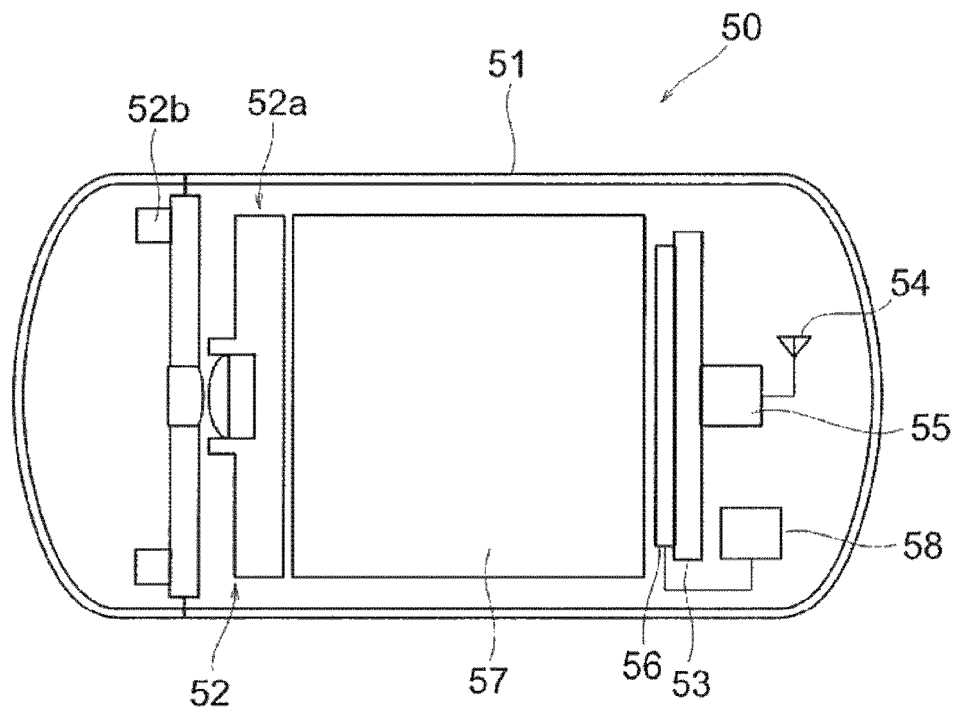
FIG. 25 is a plan view in a case where the electronic device according to the present disclosure is applied to a capsule endoscope.

As specific candidates for the electronic device having the above-described configuration, various ones are conceivable. For example, FIG. 25 is a plan view in a case where the electronic device according to the present disclosure is applied to a capsule endoscope 50. The capsule endoscope 50 of FIG. 25 includes, for example, in a housing 51 having hemispherical both end surfaces and a cylindrical central portion, a camera (an ultra-compact camera) 52 to capture an image in a body cavity, a memory 53 to record image data captured by the camera 52, and a wireless transmitter 55 to transmit recorded image data to outside via an antenna 54 after the capsule endoscope 50 is discharged to outside the body of an examinee is provided.

Furthermore, in the housing 51, a central processing unit (CPU) 56 and a coil (a magnetic force/current conversion coil) 57 are provided. The CPU 56 controls image-capturing by the camera 52 and a data accumulation operation into the memory 53, and controls data transmission from the memory 53 to a data receiving device (not illustrated) outside the housing 51 by the wireless transmitter 55. The coil 57 supplies power to the camera 52, the memory 53, the wireless transmitter 55, the antenna 54, and a light source 52b to be described later.

Moreover, the housing 51 is provided with a magnetic (reed) switch 58 for detection of when the capsule endoscope 50 is set to a data receiving device. The CPU 56 supplies power from the coil 57 to the wireless transmitter 55 at a time when the reed switch 58 detects the set to the data receiving device and data transmission becomes possible.

The camera 52 includes, for example, an imaging element 52a including an objective optical system 9 to capture an image in a body cavity, and a plurality of light sources 52b to illuminate the body cavity. Specifically, the camera 52 includes a complementary metal oxide semiconductor (CMOS) sensor, a charge coupled device (CCD), or the like including, for example, a light emitting diode (LED) as the light source 52b.

The display unit 2 in the electronic device according to the present disclosure is a concept including a light emitter such as the light source 52b in FIG. 25. The capsule endoscope 50 of FIG. 25 includes, for example, two light sources 52b, but these light sources 52b can be configured by a display panel 4 having a plurality of light source units or an LED module having a plurality of LEDs. In this case, by arranging an imaging unit 8 of the camera 52 below the display panel 4 or the LED module, restrictions on layout arrangement of the camera 52 are reduced, and the capsule endoscope 50 having a smaller size can be achieved.

Figure 26:
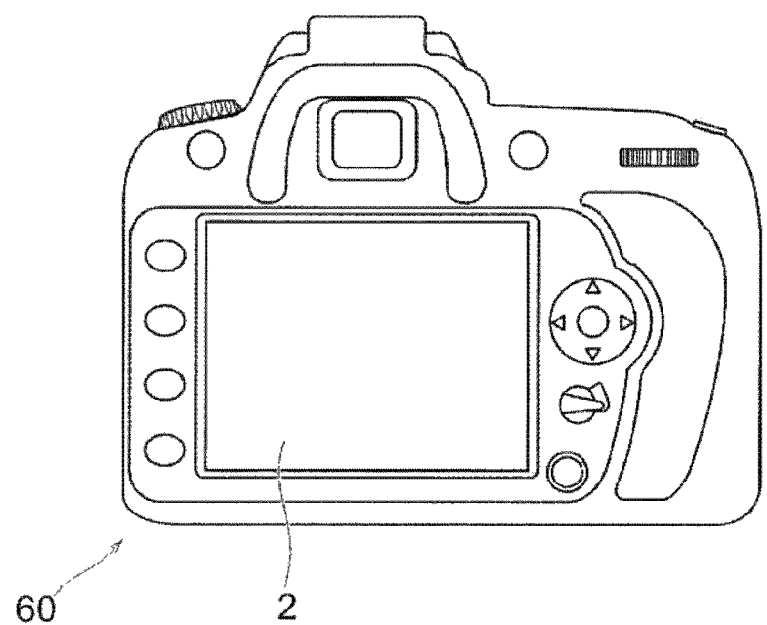
FIG. 26 is a rear view in a case where the electronic device according to the present disclosure is applied to a digital single-lens reflex camera.

Furthermore, FIG. 26 is a rear view in a case where the electronic device according to the present disclosure is applied to a digital single-lens reflex camera 60. The digital single-lens reflex camera 60 and a compact camera include a display unit 2 that displays a preview screen on a back surface on a side opposite to a lens. By arranging a camera module 3 on a side opposite to the display surface of the display unit 2, a face image of a person who captures an image may be enabled to be displayed on a display screen 1a of the display unit 2. In the electronic device according to the present disclosure, since the camera module 3 can be arranged in an area overlapping the display unit 2, it is not necessary to provide the camera module 3 in a frame portion of the display unit 2, and a size of the display unit 2 can be increased as much as possible.

Figure 27:
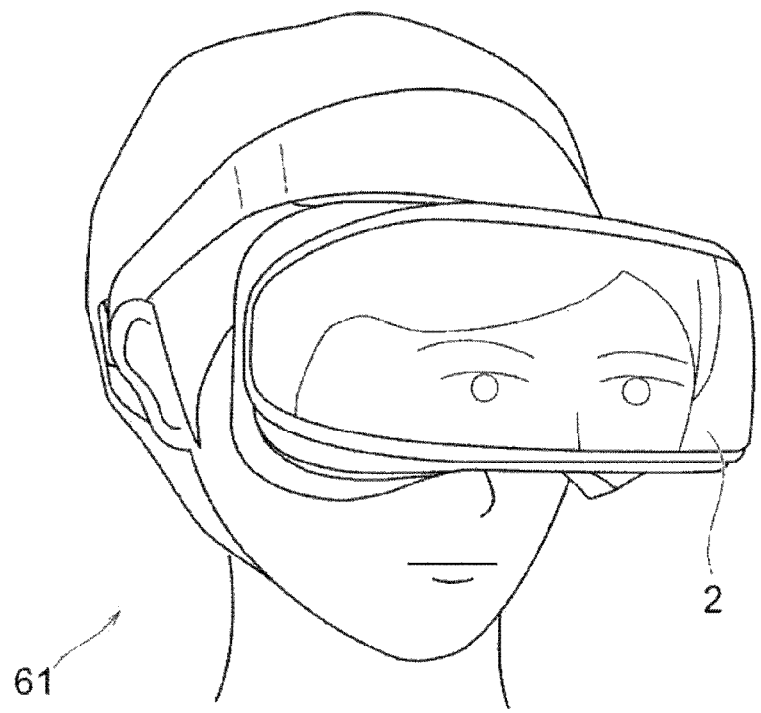
FIG. 27 is a view illustrating an example in which the electronic device is applied to an HMD.
Figure 28:
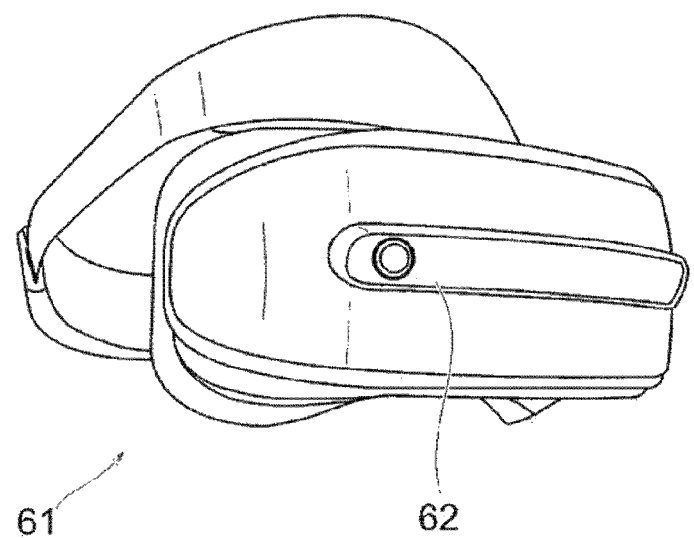
FIG. 28 is a view illustrating a current HMD.

FIG. 27 is a plan view illustrating an example in which the electronic device according to the present disclosure is applied to a head mounted display (HMD) 61. The HMD 61 in FIG. 27 is used for virtual reality (VR), augmented reality (AR), mixed reality (MR), substituional reality (SR), or the like. As illustrated in FIG. 28, in a current HMD, a camera 62 is mounted on an outer surface, and a wearer of the HMD can visually recognize a surrounding image. However, there is a problem that a surrounding person cannot recognize the eyes or expression of the face of the wearer of the HMD.

Therefore, in FIG. 27, a display surface of a display unit 2 is provided on an outer surface of the HMD 61, and a camera module 3 is provided on an opposite side of the display surface of the display unit 2. As a result, expression of the face of the wearer subjected to image-capturing by the camera module 3 can be displayed on the display surface of the display unit 2, and a person around the wearer can grasp the expression of the face and a movement of the eyes of the wearer in real time.

In the case of FIG. 27, since the camera module 3 is provided on a back surface side of the display unit 2, there is no restriction on an installation location of the camera module 3, and a degree of freedom in design of the HMD 61 can be increased. Furthermore, since the camera can be arranged at an optimum position, it is possible to prevent problems such as misalignment of eye level of the wearer displayed on the display surface.

In this way, the electronic device according to the present disclosure can be used for various purposes, and the utility value of the device can be increased.

Note that the present technology can have the following configurations.

(1)
An electronic device including:
a display unit configured to be deformable; and
at least one first imaging unit arranged on an opposite side of a display surface of the display unit and configured to photoelectrically convert incident light transmitted through the display unit.

(2)
The electronic device according to (1), in which
the display unit is foldable.

(3)
The electronic device according to (2), in which
the display unit includes a first area, a second area, and a third area, and
a portion between the first area and the second area of the display unit and a portion between the second area and the third area of the display unit are able to be mountain folded.

(4)
The electronic device according to (3), in which
the first imaging unit is arranged on an opposite side of the display surface in the second area.

(5)
The electronic device according to (3), in which
in the display unit, the first imaging unit is individually arranged on an opposite side of the display surface in the first area and on an opposite side of the display surface in the third area.

(6)
The electronic device according to (1), in which
at least a part of the display unit is bendable.

(7)
The electronic device according to (6), in which
the first imaging unit is arranged at a position corresponding to an inner peripheral side of a convex curved surface formed when the display unit is bent.

(8)
The electronic device according to (6) or (7), in which
when the display unit is bent, at least a part of a member on a light incident direction side from the first imaging unit is moved out of an angle of view of the first imaging unit.

(9)
The electronic device according to any one of (1) to (8), further including:
a second imaging unit arranged on a surface on a side opposite to the display unit.

(10)
The electronic device according to any one of (1) to (9), in which
in the first imaging unit, an optical system used for image-capturing is switchable in accordance with a shape of the display unit.

(11)
The electronic device according to any one of (1) to (10), further including:
a processing circuit configured to output, to the display unit, a first image based on a captured image of the first imaging unit.

(12)
The electronic device according to (11), in which
the processing circuit is configured to determine a position and a range of the display unit in which each portion of the first image is displayed, in accordance with an angle of view in the captured image.

(13)
The electronic device according to (11) or (12), in which
the display unit includes a touch panel, and
the processing circuit is configured to detect at least any subject included in the captured image.

(14)
The electronic device according to (13), in which
the processing circuit is configured to detect that an area in which a subject is displayed on the display unit is touched, and output a second image obtained by cropping a partial angle of view of the first imaging unit including the area, to at least any part of the display unit.

(15)
The electronic device according to (13), in which
the processing circuit is configured to detect that an area in which a subject is displayed on the display unit is touched, and start recording of a first video image obtained by cropping a partial angle of view of the first imaging unit including the area.

(16)
The electronic device according to (15), in which
the processing circuit is configured to record a second video image having a larger angle of view than the first video image in parallel with recording of the first video image.

(17)
An electronic device including:
a display unit configured to be deformable; and
an imaging unit configured to image incident light transmitted through the display unit, in which
the imaging unit is configured to perform imaging at a first angle of view in a case where the display unit is in a first shape, and perform imaging at a second angle of view wider than the first angle of view in a case where the display unit is in a second shape.

(18)
The electronic device according to (17), in which
the first shape is an unfolded state, and the second shape is a folded state.

(19)
An electronic device including:
a display unit configured to be deformable; and
a third imaging unit and a fourth imaging unit each configured to image incident light transmitted through the display unit, in which
the third imaging unit is configured to perform imaging at a third angle of view,
the fourth imaging unit is configured to perform imaging at a fourth angle of view,
the third angle of view and the fourth angle of view partially overlap each other in a case where the display unit is in a first shape, and
the third angle of view and the fourth angle of view do not overlap each other in a case where the display unit is in a second shape.

(20)
The electronic device according to (19), in which
a processing circuit configured to synthesize an image obtained by the third imaging unit and an image obtained by the fourth imaging unit in a case where the display unit is in a second shape.

(21)
The electronic device according to any one of (3) to (5), in which
the first area of the display unit and the second area of the display unit face in opposite directions when the display unit is folded.

(22)
The electronic device according to (6), in which
the display unit is bendable into a convex curved surface shape.

(23)
The electronic device according to any one of (1) to (16), in which
the display unit has a plurality of tapered through holes in a portion overlapping the first imaging unit in a thickness direction.

(24)
The electronic device according to any one of (1) to (16), further including:
a plurality of the first imaging units connected by a connection unit having elasticity and flexibility.

Aspects of the present disclosure are not limited to the above-described individual embodiments, but include various modifications that can be conceived by those skilled in the art, and the effects of the present disclosure are not limited to the above-described contents. That is, various additions, modifications, and partial deletions can be made without departing from the conceptual idea and spirit of the present disclosure derived from the contents defined in the claims and equivalents thereof.

REFERENCE SIGNS LIST 1, 1A, 1B Electronic device
2 Display unit
3, 3A, 3B, 79 Camera module
4 Display panel
7 Protective layer
8 Imaging unit
10 Folding mechanism
14 Sensor
17 Jig
21 First area
22 Second area
23 Third area
41 Storage unit
200 Processing circuit

The invention claimed is:
1. An electronic device, comprising:
a display that is deformable;
at least one first imaging sensor on an opposite side of a display surface of the display, wherein
the at least one first imaging sensor is configured to capture an image of light that passes through the display;
a sensor configured to detect a folded state and an unfolded state of the electronic device; and
a processing circuit configured to execute, based on a detection result from the sensor, cropping of an area from the captured image, wherein the area corresponds to an effective angle of view of the at least one first imaging sensor.

2. The electronic device according to claim 1, wherein the display is foldable.

3. The electronic device according to claim 2, wherein
the display includes a first area, a second area, and a third area, and
each of a portion between the first area and the second area of the display and a portion between the second area and the third area of the display is mountain foldable.

4. The electronic device according to claim 3, wherein the at least one first imaging sensor is on an opposite side of the display surface in the second area.

5. The electronic device according to claim 3, wherein
in the display, the at least one first imaging sensor is individually on an opposite side of the display surface in the first area and on an opposite side of the display surface in the third area.

6. The electronic device according to claim 1, wherein at least a part of the display is bendable.

7. The electronic device according to claim 6, wherein the at least one first imaging sensor is at a position corresponding to an inner peripheral side of a convex curved surface in a case where the display is bent.

8. The electronic device according to claim 6, wherein
in a case where the display is bent, at least a part of a member on a light incident direction side from the at least one first imaging sensor moves out of an angle of view of the at least one first imaging sensor.

9. The electronic device according to claim 1, further comprising:
a second imaging sensor on a surface on a side opposite to the display.

10. The electronic device according to claim 1, wherein
in the at least one first imaging sensor, an optical system for image-capture is switchable based on a shape of the display.

11. The electronic device according to claim 1, wherein the processing circuit is further configured to output, to the display, a first image based on the captured image of the at least one first imaging sensor.

12. The electronic device according to claim 11, wherein the processing circuit is further configured to determine a position and a range of the display in which each portion of the first image is displayed, based on an angle of view in the captured image.

13. The electronic device according to claim 11, wherein the display includes a touch panel, and
the processing circuit is further configured to detect a subject included in the captured image.

14. The electronic device according to claim 13, wherein the processing circuit is further configured to:
detect a touch on an area in which the subject is displayed on the display, and
output a second image by cropping a partial angle of view of the at least one first imaging sensor including the area, to at least a part of the display.

15. The electronic device according to claim 13, wherein the processing circuit is further configured to:
detect a touch on an area in which the subject is displayed on the display, and
record a first video image obtained by cropping a partial angle of view of the first imaging sensor including the area.

16. The electronic device according to claim 15, wherein the processing circuit is further configured to record a second video image in parallel with the recording of the first video image, wherein the second video image has a larger angle of view than the first video image.

17. An electronic device, comprising:
a display that is deformable;
a sensor configured to detect a first shape and a second shape of the display;
an imaging sensor configured to:
capture an image of light that passes through the display,
execute imaging at a first angle of view in a case where the display is in the first shape, and
execute imaging at a second angle of view wider than the first angle of view in a case where the display is in the second shape; and
a processing circuit configured to execute, based on a detection result from the sensor, cropping of an area from the captured image, wherein
the area corresponds to an effective angle of view of the imaging sensor.

18. The electronic device according to claim 17, wherein the first shape is an unfolded state, and
the second shape is a folded state.

19. An electronic device, comprising:
a display that is deformable; and
a first imaging sensor and a second imaging sensor, each configured to image light that passes through the display, wherein
the first imaging sensor is configured to execute imaging at a first angle of view,
the second imaging sensor is configured to execute imaging at a second angle of view,
the first angle of view and the second angle of view partially overlap each other in a case where the display is in a first shape,
the first shape is an unfolded state,
the first angle of view and the second angle of view do not overlap each other in a case where the display is in a second shape, and
the second shape is a folded state.

20. The electronic device according to claim 19, wherein
a processing circuit is configured to synthesize an image based on a first image of the first imaging sensor and a second image of the second imaging sensor in a case where the display is in the second shape.

* * * * *